(12) United States Patent
Jang et al.

(10) Patent No.: US 10,219,102 B2
(45) Date of Patent: Feb. 26, 2019

(54) METHOD FOR RECOGNIZING LOCATION AND ELECTRONIC DEVICE IMPLEMENTING THE SAME

(71) Applicant: SAMSUNG ELECTRONICS CO., LTD., Suwon-si, Gyeonggi-do (KR)

(72) Inventors: Jihoon Jang, Yongin-si (KR); Duseok Kim, Yongin-si (KR); Younghyun Kim, Gunpo-si (KR); Suneung Park, Seoul (KR); Dongju Lee, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/667,342

(22) Filed: Aug. 2, 2017

(65) Prior Publication Data
US 2018/0063673 A1 Mar. 1, 2018

(30) Foreign Application Priority Data
Aug. 25, 2016 (KR) .......................... 10-2016-0108460

(51) Int. Cl.
*H04W 4/02* (2018.01)
*H04W 4/021* (2018.01)
(Continued)

(52) U.S. Cl.
CPC ............ *H04W 4/02* (2013.01); *H04B 17/318* (2015.01); *H04W 64/00* (2013.01); *H04W 4/021* (2013.01); *H04W 4/023* (2013.01); *H04W 84/12* (2013.01)

(58) Field of Classification Search
CPC ....... H04W 4/02; H04W 64/00; H04W 4/023; H04W 84/12; H04W 4/021; H04B 17/318
See application file for complete search history.

(56) References Cited

U.S. PATENT DOCUMENTS 8,385,943 B1 * 2/2013 Han ...................... H04W 4/043
455/456.1
9,183,409 B2 11/2015 Son
(Continued)

FOREIGN PATENT DOCUMENTS

EP 1 726 169 10/2014
WO 2011/070551 6/2011
(Continued)

OTHER PUBLICATIONS

International Search Report, Application No. PCT/KR2017/008468 dated Oct. 31, 2017.
(Continued)

*Primary Examiner* — Brandon J Miller
(74) *Attorney, Agent, or Firm* — Nixon & Vanderhye P.C.

(57) ABSTRACT

In various example embodiments, an electronic device includes a communication module comprising communication circuitry, a memory, and a processor. The communication module is configured to receive access point (AP) information from each of a plurality of AP devices. The processor is configured to receive, from the AP information, a strength value of a signal and a unique value of the AP device that transmits the signal, and to processes the AP information, based on the strength value of the signal and the unique value of the AP device. Also, the processor is configured to create an AP list as information for indicating a location of the electronic device, based on a result of processing the AP information, and to store the created AP list in the memory. The processor is configured to determine whether the AP information satisfies a condition for performing a predefined function with regard to the AP list stored in the memory, and to perform the predefined function if the condition is satisfied.

20 Claims, 17 Drawing Sheets

(51) Int. Cl.
*H04W 64/00* (2009.01)
*H04W 84/12* (2009.01)
*H04B 17/318* (2015.01)

(56) References Cited

U.S. PATENT DOCUMENTS

| | | | |
|---|---|---|---|
| 9,392,406 B2* | 7/2016 | Houri | G01S 5/0252 |
| 10,089,810 B1* | 10/2018 | Kaye | G07C 9/00309 |
| 2005/0208952 A1 | 9/2005 | Dietrich et al. | |
| 2011/0286437 A1 | 11/2011 | Austin et al. | |
| 2011/0306354 A1 | 12/2011 | Ledlie et al. | |
| 2013/0065615 A1 | 3/2013 | Jeong et al. | |
| 2014/0051357 A1 | 2/2014 | Steer et al. | |
| 2014/0073288 A1* | 3/2014 | Velasco | H04W 4/02 455/411 |
| 2015/0237471 A1 | 8/2015 | Li et al. | |
| 2015/0296074 A1 | 10/2015 | Shah et al. | |
| 2016/0063847 A1* | 3/2016 | Hawkins | G08B 21/24 340/539.11 |
| 2016/0066157 A1 | 3/2016 | Noorshams et al. | |
| 2016/0077190 A1 | 3/2016 | Julian | |
| 2016/0142925 A1 | 5/2016 | Pang et al. | |
| 2016/0255470 A1 | 9/2016 | Lee | |
| 2018/0113189 A1* | 4/2018 | Khan | G01S 5/0252 |

FOREIGN PATENT DOCUMENTS

| | | |
|---|---|---|
| WO | 2012/114161 | 8/2012 |
| WO | 2015/099759 | 7/2015 |

OTHER PUBLICATIONS

Extended Search Report dated Feb. 2, 2018 in counterpart European Patent Application No. 17187796.2.

Bahl, P. et. al., "Radar: An In-building RF-based User Location and Tracking System," INFOCOM 2000. Nineteenth Annual Joint Conference of the IEEE Computer and Communications Societies. IEEE vol. 2, Mar. 26, 2000, pp. 775-784, XP010376167, ISBN: 978-0-7803-5880-5.

* cited by examiner

METHOD FOR RECOGNIZING LOCATION AND ELECTRONIC DEVICE IMPLEMENTING THE SAME

CROSS-REFERENCE TO RELATED APPLICATION

This application is based on and claims priority under 35 U.S.C. § 119 to a Korean patent application filed on Aug. 25, 2016 in the Korean Intellectual Property Office and assigned Serial number 10-2016-0108460, the disclosure of which is incorporated by reference herein in its entirety.

TECHNICAL FIELD

The present disclosure relates generally to a method for recognizing a location and an electronic device implementing the method.

BACKGROUND

Electronic devices such as smart phones, tablet PCs, desktop PCs, portable multimedia players (PMPs), MP3 players, or wearable devices are widely used in these days. Such electronic devices are equipped with various sensors, so that the electronic device can acquire and utilize various kinds of information through the sensor. In particular, the electronic device can recognize a user location, based on information about a location thereof, and also provide useful functions based on the user location.

Traditionally, the electronic device can acquire location information thereof by using a global positioning system (GPS) function of receiving a satellite signal and measuring a current location. This technique, however, has some problems of requiring a GPS receiver and being unavailable in an indoor space. As an alternative technique for recognizing an indoor location, the electronic device may use a Bluetooth (BT) beacon. However, this technique as well needs an additional device and also is inconvenient for the user to reset whenever the location is changed.

In order to address the above-mentioned problems, an attempt has been made to recognize the location of the electronic device by using an access point (AP) widely installed in an indoor space for a wireless LAN (WLAN) service.

SUMMARY

In view of changes in communication environment, various example embodiments of the present disclosure provide a method for recognizing a location of an electronic device by collecting information of an access point, and providing an electronic device that implements the method.

In addition, various example embodiments of the present disclosure also provide an electronic device that sets up, as a specific location, a location thereof recognized by collecting information of an access point and then performs a predefined function when the electronic device arrives at the specific location.

According to various example embodiments of the present disclosure, an electronic device may comprise a communication module comprising communication circuitry configured to receive access point (AP) information from each of a plurality of AP devices, a memory, and a processor. The processor may be configured to obtain, from the AP information, a strength value of a signal and a unique value of the AP device that transmits the signal, to process the AP information, based on the strength value of the signal and the unique value of the AP device, to create an AP list as information for indicating a location of the electronic device based on a result of processing the AP information, to store the created AP list in the memory, to determine whether the AP information satisfies a condition for performing a predefined function with regard to the AP list stored in the memory, and to perform the predefined function if the condition is satisfied.

According to various example embodiments of the present disclosure, a method for recognizing a location and an electronic device implementing the method can perform location recognition based on signal information collected from a plurality of widely installed APs without requiring any additional device.

According to various example embodiments of the present disclosure, a method for recognizing a location and an electronic device implementing the method may perform location recognition based on signal information collected from a plurality of APs, set up a frequently recognized location as a specific location, and predefine a particular function to be performed at the specific location.

BRIEF DESCRIPTION OF THE DRAWINGS

The above and/or other aspects, features and attendant advantages of the present disclosure will be more apparent and readily appreciated from the following detailed description, taken in conjunction with the accompanying drawings, in which like reference numerals refer to like elements, and wherein.

DETAILED DESCRIPTION

Figure 1:
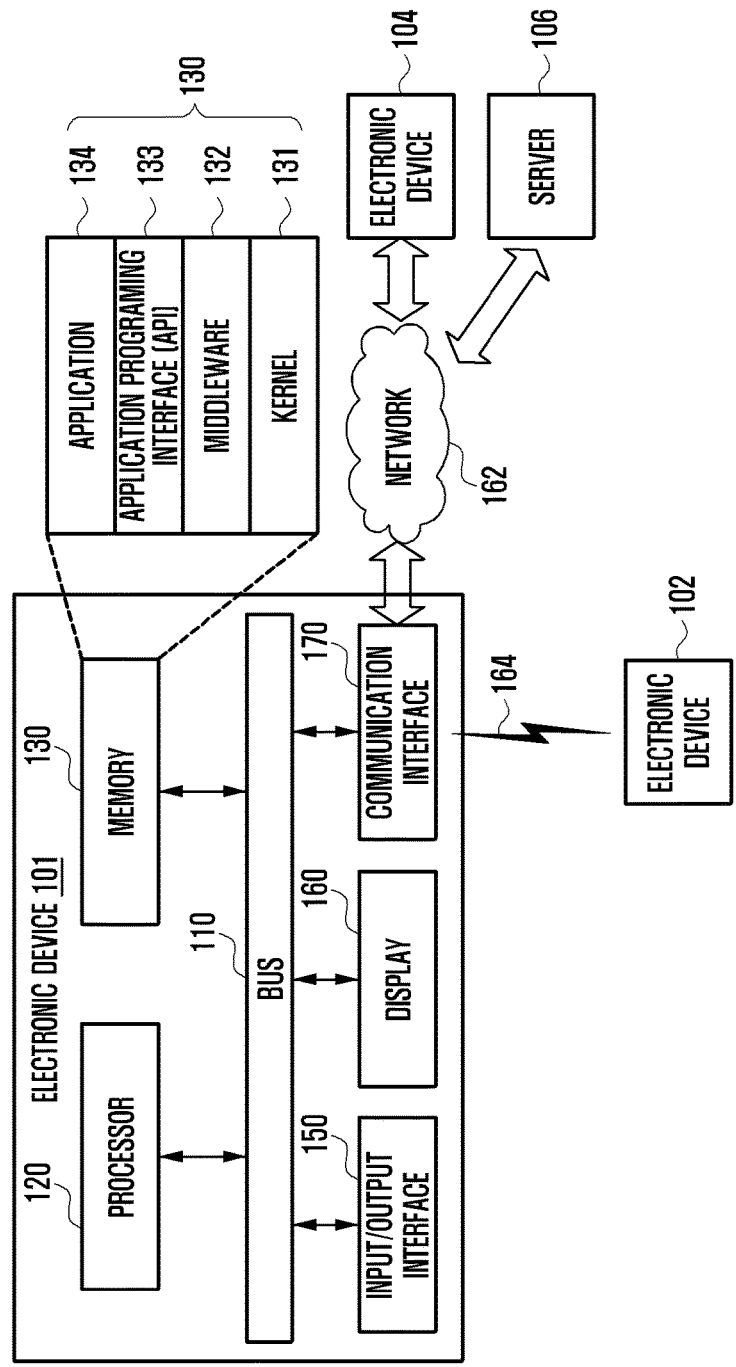
FIG. 1 is a block diagram illustrating a network environment including an example electronic device according to various example embodiments of the present disclosure.

The following description is made with reference to the accompanying drawings is provided to assist in a comprehensive understanding of certain embodiments of the present disclosure as defined by the claims and their equivalents. It includes various specific details to assist in the understanding but these are to be regarded as merely example. Accordingly, those of ordinary skill in the art will recognize that various changes and modifications of the embodiments described herein may be made without departing from the scope and spirit of the present disclosure. In addition, descriptions of well-known functions and constructions may be omitted for clarity and conciseness.

The terms and words used in the following description and claims are not limited to their dictionary meanings, but are used to enable a clear and consistent understanding of the present disclosure. Accordingly, it should be apparent to those skilled in the art that the following description of embodiments of the present disclosure is provided for illustration purposes only and not for the purpose of limiting the present disclosure, as defined by the appended claims and their equivalents.

It is to be understood that the singular forms "a", "an", and "the", include plural forms as well unless the context clearly dictates otherwise. Thus, for example, a reference to "a component surface" includes a reference to one or more of such surfaces.

The expressions "include" and "may include" which may be used in the present disclosure denote the presence of the disclosed functions, operations, and elements, and do not limit one or more additional functions, operations, and elements. In the present disclosure, the terms "include" and/or "have", may be understood to denote a certain characteristic, number, operation, constituent element, component or a combination thereof, but should not be construed to exclude the existence of, or a possibility of, the addition of one or more other characteristics, numbers, operations, constituent elements, components or combinations thereof.

In the present disclosure, the expression "and/or" includes any and all combinations of the associated listed words. The expression "A and/or B" may include A, may include B, or may include both A and B.

In the present disclosure, expressions including ordinal numbers, such as "first", "second", and/or the like, may modify various elements. However, such elements are not limited by the above expressions. The above expressions do not limit the sequence and/or importance of the elements. The above expressions are used merely for the purpose of distinguishing an element from the other elements. For example, a first user device and a second user device indicate different user devices, although both are user devices. For further example, a first element may be referred to as a second element, and similarly, a second element may also be referred to as a first element without departing from the scope of the present disclosure.

In the case where a component is referred to as being "connected to" or "accessed by" another component, it should be understood that not only is the component connected to or accessed by the other component, but also another component may exist between the component and the other component. In the case where a component is referred to as being "directly connected" or "directly accessed" to another component, it should be understood that there is no component therebetween.

Unless otherwise defined, all terms including technical and/or scientific terms used herein have the same meaning as commonly understood by one of ordinary skill in the art to which the present disclosure pertains. In addition, unless otherwise defined, all terms defined in generally used dictionaries may not be interpreted to have ideal or excessively formal meanings.

According to an example embodiment of the present disclosure, the electronic device may include at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player (e.g., moving picture experts group phase 1 or phase 2 (MPEG-1 or MPEG-2) audio layer 3 (MP3) player), a mobile medical device, a camera, or a wearable device. Examples of the wearable device include a head-mounted-device (HMD) (e.g., electronic eyeglasses), electronic clothing, an electronic bracelet, an electronic necklace, an appcessory, an electronic tattoo, a smart watch, or the like, but is not limited thereto.

The electronic device, according to an example embodiment of the present disclosure, may also include various smart home appliances. Examples of such smart home appliances may include a television (TV), a digital versatile disc (DVD) player, an audio system, a refrigerator, an air-conditioner, a cleaning device, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, an electronic album, or the like, but is not limited thereto.

The electronic device, according to an example embodiment of the present disclosure, may also include medical devices (e.g., magnetic resonance angiography (MRA), magnetic resonance imaging (MRI), computed tomography (CT), a scanning machine, an ultrasonic scanning device, and the like), a navigation device, a global positioning system (GPS) receiver, an event data recorder (EDR), a flight data recorder (FDR), a vehicle infotainment device, an electronic equipment for ships (e.g., navigation equipment, gyrocompass, and the like), avionics, a security device, a head unit for vehicles, an industrial or home robot, an automatic teller machine (ATM), a point of sales (POS) system, or the like, but is not limited thereto.

The electronic device according to an example embodiment of the present disclosure may also include furniture or a portion of a building/structure, an electronic board, an electronic signature receiving device, a projector, various measuring instruments (e.g., a water meter, an electric meter, a gas meter and a wave meter) or the like, but is not limited thereto. The electronic device may also include a combination of the devices listed above. In addition, the electronic device may be a flexible and/or contoured device. It should be apparent to those skilled in the art that the electronic device is not limited to the aforementioned devices.

Hereinafter, electronic devices according to an embodiment of the present disclosure will be described in greater detail with reference to the accompanying drawings. In the description, the term 'user' may refer to a person or a device (e.g., an artificial intelligence electronic device) that uses or otherwise controls the electronic device.

FIG. 1 is a block diagram illustrating a configuration of an example electronic device in a network environment, according to an example embodiment of the present disclosure.

Referring to FIG. 1, an electronic device 101 includes a bus 110, a processor (e.g., including processing circuitry) 120 (e.g., at least one processor), a memory 130, an input/output (I/O) interface (e.g., including input/output circuitry) 150, a display 160 and a communication interface (e.g., including communication circuitry) 170.

The bus 110 may be a communication circuit that connects the components to each other and transfers data (e.g., control messages) between the components.

The processor 120 may include various processing circuitry, such as, for example, and without limitation, a dedicated processor, a CPU, an application processor, a communication processor, or the like, to receive instructions from the components (e.g., the memory 130, I/O interface 150, display 160 and communication interface 170) via the bus 110, decode the instructions and perform corresponding operations or data processing according to the decoded instructions.

The memory 130 may store instructions or data transferred from/created in the processor 120 or the other components (e.g., I/O interface 150, display 160 and communication interface 170). The memory 130 includes programming modules, e.g., a kernel 131, a middleware 132, an application programming interface (API) 133, and an application module 134. Each of the programming modules may be software, firmware, hardware or a combination thereof.

The kernel 131 may control or manage system resources (e.g., the bus 110, processor 120, and memory 130) used to execute operations or functions of the programming modules, e.g., the middleware 132, API 133, and application module 134. The kernel 131 may also provide an interface that may access and control/manage the components of the electronic device 101 via the middleware 132, API 133, and application module 134.

The middleware 132 may make it possible for the API 133 or application module 134 to perform data communication with the kernel 131. The middle ware 132 may also perform control operations (e.g., scheduling and load balancing) for task requests transmitted from the application module 134 using, for example, a method for assigning the order of priority to use the system resources (e.g., the bus 110, processor 120, and memory 130) of the electronic device 101 to at least one of the applications of the application module 134.

The API 133 is an interface that allows the application module 134 to control functions of the kernel 131 or middleware 132. The API 133 may include at least one interface or function (e.g., instruction) for file control, window control, character control, video process, and the like.

In an embodiment of the present disclosure, with reference to FIG. 1, the application module 134 may include applications that are related to short message service (SMS)/multimedia messaging service (MMS), email, calendar, alarm, health care (e.g., an application for measuring blood sugar level, a workout application, and the like), and environment information (e.g., atmospheric pressure, humidity, temperature, and the like). The application module 134 may be an application related to exchanging information between the electronic device 101 and an external electronic device 104. The information exchange-related application may include a notification relay application for transmitting specific information to an external electronic device or a device management application for managing external electronic devices.

The notification relay application may include a function for transmitting notification information, created by the other applications of the electronic device 101 (e.g., SMS/MMS application, email application, health care application, environment information application, and the like), to the electronic device 104. In addition, the notification relay application may receive notification information from the external electronic device 104 and provide it to the user. The device management application may manage (e.g., install, delete, or update) part of the functions of the external electronic device 104 communicating with the electronic device 101, e.g., turning on/off the external electronic device, turning on/off part of the components of the external electronic device, adjusting the brightness or the display resolution of the display of the external electronic device, and the like, applications operated in the external electronic device, or services from the external electronic device, e.g., call service or messaging service, and the like.

In an embodiment of the present disclosure, the application module 134 may also include applications designated according to attributes (e.g., type of electronic device) of the external electronic device 104. For example, if the external electronic device 104 is an MP3 player, the application module 134 may include an application related to music playback. If the external electronic device 104 is a mobile medical device, the application module 134 may include an application related to health care. The application module 134 may include an application designated in the electronic device 101 and applications transmitted from the server 106, electronic device 104, and the like.

The I/O interface 150 may include various circuitry to receive instructions or data from the user via an I/O system (e.g., a sensor, keyboard or touch screen) and transfers them to the processor 120, memory 130 or communication interface 170 through the bus 110. The I/O interface 150 may provide data corresponding to a user's touch input to a touch screen to the processor 120. The I/O interface 150 may receive instructions or data from the processor 120, memory 130 or communication interface 170 through the bus 110, and output them to an I/O system (e.g., a speaker or a display). The I/O interface 150 may output voice data processed by the processor 120 to a speaker.

The display 160 may display information (e.g., multimedia data, text data, and the like) on a screen so that the user may view it.

The communication interface 170 may include various communication circuitry to communicate between the electronic device 101 and an external electronic device 104 or server 106. The communication interface 170 may connect to a network 162 in a wireless or wired mode, and communicate with the external system. Additionally, the communication interface 170 may establish a short-range wireless communication connection 164 with an external electronic device (e.g., external electronic device 102). Wireless communication may include wireless fidelity (Wi-Fi), Bluetooth™ (BT), near field communication (NFC), GPS or cellular communication (e.g., long term evolution (LTE), LTE-advanced (LTE-A), code division multiple access (CDMA), wideband CDMA (WCDMA), universal mobile telecommunications system (UMTS), wireless broadband (Wi-Bro), global system for mobile communications (GSM), and the like). In addition, the wireless communication may include, for example, short-range communication 164. Wired communication may include universal serial bus (USB), high definition multimedia interface (HDMI), recommended standard 232 (RS-232), plain old telephone service (POTS), and the like.

In an embodiment of the present disclosure, the network 162 may be a telecommunication network. The telecommunication network may include a computer network, the Internet, the Internet of things (IoT), a telephone network, and the like. The protocol for communication between the electronic device 101 and the external system, e.g., transport layer protocol, data link layer protocol, or physical layer protocol, may be supported by at least one of the application module 134, API 133, middleware 132, kernel 131 and communication interface 170.

Figure 2:
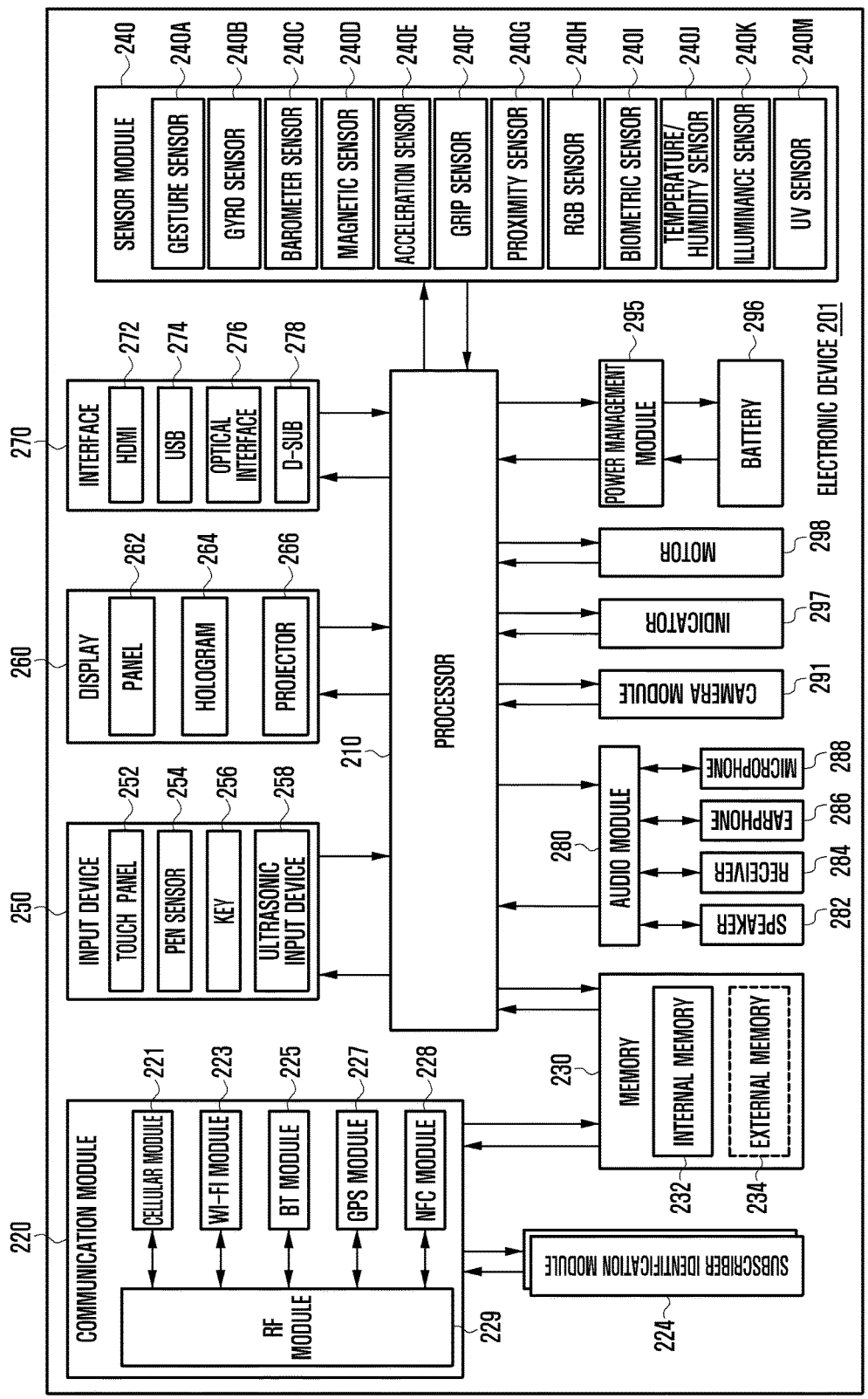
FIG. 2 is a block diagram illustrating an example electronic device according to various example embodiments of the present disclosure.

FIG. 2 is a block diagram illustrating an example electronic device according to an example embodiment of the present disclosure.

Referring to FIG. 2, an electronic device 201 may include all or part of the electronic device 101 as illustrated in FIG. 1, and includes one or more processors or an application processor (AP) (e.g., including processing circuitry) 210, a communication module (e.g., including communication circuitry) 220, a subscriber identification module (SIM) card 224, a memory 230, a sensor module 240, an input device (e.g., including input circuitry) 250, a display module 260, an interface (e.g., including interface circuitry) 270, an audio module 280, a camera module 291, a power management module 295, a battery 296, an indicator 297, and a motor 298.

The AP 210 may include various processing circuitry and control a number of hardware or software components connected thereto by executing the operating system or applications, process data including multimedia data, and perform corresponding operations. The AP 210 may be implemented with a system on chip (SoC). In an embodiment of the present disclosure, the AP 210 may further include a graphics processing unit (GPU).

The communication module 220 performs communication for data transmission/reception between an electronic device 102 or 104, and server 106 that are connected to the electronic device 101 via the network. In an embodiment of the present disclosure, the communication module 220 may include various communication circuitry, such as, for example, and without limitation, a cellular module 221, a Wi-Fi module 223, a BT module 225, a GPS module 227, an NFC module 228 and a radio frequency (RF) module 229.

The cellular module 221 may provide voice call, video call, SMS or Internet service, and the like, via a communication network (e.g., LTE, LTE-A, CDMA, WCDMA, UMTS, Wi-Bro, GSM, and the like). The cellular module 221 may also perform identification or authentication for electronic devices in a communication network by using the SIM card 224. In an embodiment of the present disclosure, the cellular module 221 may perform part of the functions of the AP 210. The cellular module 221 may perform part of the functions for controlling multimedia.

In an embodiment of the present disclosure, the cellular module 221 may include a communication processor (CP). The cellular module 221 may be implemented with, for example, an SoC. Although the embodiment of the present disclosure illustrated in FIG. 2 is implemented in such a way that the cellular module 221, the power management module 295, the memory 230, and the like, are separate from the AP 210, an embodiment of the present disclosure may be modified such that the AP 210 includes at least part of the listed elements or other elements of the device 201 (e.g., cellular module 221).

In an embodiment of the present disclosure, the AP 210 or the cellular module 221 may load instructions or data transmitted to and from at least one of a non-volatile memory or other components, to a volatile memory and then process them. The AP 210 or the cellular module 221 may also store data which is transmitted from/created in at least one of the components, in a non-volatile memory.

The Wi-Fi module 223, the BT module 225, the GPS module 227 and the NFC module 228 may include processors for processing transmission/reception of data, respectively. Although the embodiment of the present disclosure shown in FIG. 2 is implemented such that the cellular module 221, Wi-Fi module 223, BT module 225, GPS module 227, and NFC module 228 are separate from each other, an embodiment of the present disclosure may be modified such that parts of the elements (e.g., two or more) are included in an integrated chip (IC) or an IC package. For example, part of the processors corresponding to the cellular module 221, Wi-Fi module 223, BT module 225, GPS module 227, and NFC module 228, e.g., a CP corresponding to the cellular module 221 and a Wi-Fi processor corresponding to the Wi-Fi module 223, may be implemented with an SoC.

The RF module 229 may transmit or receive data, e.g., RF signals. The RF module 229 may include a transceiver, a power amplifier module (PAM), a frequency filter, a low noise amplifier (LNA), and the like. The RF module 229 may also include parts for transmitting/receiving electromagnetic waves, e.g., conductors, wires, and the like, via free space during wireless communication. Although embodiment of the present disclosure shown in FIG. 2 is implemented in such a way that the cellular module 221, Wi-Fi module 223, BT module 225, GPS module 227, and NFC module 228 share the RF module 229, an embodiment of the present disclosure may be modified such that at least one of the elements transmit or receives RF signals via a separate RF module.

The SIM card 224 may be inserted into a slot of the electronic device. The SIM card 224 may include unique identification information, e.g., integrated circuit card identifier (ICCID), or subscriber information, e.g., international mobile subscriber identity (IMSI).

The memory 230 includes built-in or internal memory 232 and/or external memory 234. The internal memory 232 may include at least one of a volatile memory, e.g., dynamic random access memory (DRAM), static RAM (SRAM), synchronous dynamic RAM (SDRAM), and the like, non-volatile memory, e.g., one time programmable read only memory (OTPROM), programmable ROM (PROM), erasable and programmable ROM (EPROM), electrically erasable and programmable ROM (EEPROM), mask ROM, flash ROM, NAND flash memory, NOR flash memory, and the like.

In an embodiment of the present disclosure, the internal memory 232 may be a solid state drive (SSD). The external memory 234 may include a flash drive, e.g., compact flash (CF), secure digital (SD), micro-SD, mini-SD, extreme digital (XD), a memory stick, and the like. The external memory 234 may be functionally connected to the electronic device via various types of interfaces. The electronic device 101 may further include storage devices or storage media such as hard drives.

The sensor module 240 may measure a physical quantity or sense operation states of the electronic device 201 and convert the measured or sensed data into electrical signals. The sensor module 240 includes at least one of a gesture sensor 240A, a gyro sensor 240B, an atmospheric pressure (barometer) sensor 240C, a magnetic sensor 240D, an acceleration sensor 240E, a grip sensor 240F, a proximity sensor 240G, a color sensor 240H (e.g., a red-green-blue (RGB) sensor), a biosensor (biometric sensor) 2401, a temperature/humidity sensor 240J, an illuminance sensor 240K, and an ultra-violet (UV) sensor 240M.

The sensor module 240 may also include an electronic nose (e-nose) sensor, electromyography (EMG) sensor, an electroencephalogram (EEG) sensor, an electrocardiogram (ECG) sensor, an infrared (IR) sensor, a fingerprint sensor, an iris sensor, and the like. The sensor module 240 may further include a control circuit for controlling the one or more sensors.

The input device 250 may include various input circuitry, such as, for example, and without limitation, a touch panel 252, a pen sensor 254 (i.e., a digital pen sensor or digital stylus), a key 256 and an ultrasonic input device 258. The touch panel 252 may sense a touch using a capacitive sensing mode, a pressure sensing mode, an infrared sensing mode, and an ultrasonic sensing mode. The touch panel 252 may further include a control circuit. When the touch panel 252 is designed to operate in a capacitive sensing mode, the panel may also sense mechanical/physical touches or proximity of an object. The touch panel 252 may further include a tactile layer. In that case, the touch panel 252 may also provide tactile feedback to the user.

The pen sensor 254 (e.g., digital pen sensor) may be detected in a same or similar way as receiving a user's touch input or by using a separate recognition sheet. The key 256 may include mechanical buttons, optical keys or a key pad. The ultrasonic input device 258 is a device that may sense sounds via a microphone 288 of the electronic device 201 by using an input tool for generating ultrasonic signals, and then receiving and checking data associated with the signals. The ultrasonic input device 258 may sense signals in a wireless mode. In an embodiment of the present disclosure, the electronic device 201 may also receive a user's inputs from an external system (e.g., a computer or server) via the communication module 220.

The display module 260 includes a panel 262, a hologram unit 264, or a projector 266. The panel 262 may be implemented with a liquid crystal display (LCD), active matrix organic light emitting diodes (AMOLEDs), and the like. The panel 262 may be implemented in a flexible, transparent, impact-resistant, and/or wearable form. The panel 262 may form a single module with the touch panel 252. The hologram unit 264 shows a three-dimensional image in the air using interference of light. The projector 266 may display images by projecting light on a screen. The screen may be placed, for example, inside or outside of the electronic device 201. In an embodiment of the present disclosure, the display module 260 may further include a control circuit for controlling the panel 262, the hologram unit 264, or the projector 266.

The interface 270 may include various interface circuitry, such as, for example, and without limitation, an HDMI 272, a USB 274, an optical interface 276, a D-subminiature (D-sub) 278, and the like. The interface 270 may also be included in the communication interface 170 shown in FIG. 1. The interface 270 may also include a mobile high-definition link (MHL) interface, an SD card, a multi-media card (MMC) interface, an infrared data association (IrDA) standard interface, and the like.

The audio module 280 may provide conversions between audio and electrical signals. At least part of the components in the audio module 280 may be included in the I/O interface 150 shown in FIG. 1. The audio module 280 may process audio output from/input to, for example, a speaker 282, a receiver 284, earphones 286, the microphone 288, and the like.

The camera module 291 may take still images or moving images. In an embodiment of the present disclosure, the camera module 291 may include one or more image sensors (e.g., on the front side and/or the back side), a lens, an image signal processor (ISP), a flash (e.g., an LED or a xenon lamp), and the like.

The power management module 295 may manage electric power supplied to the electronic device 201. The power management module 295 may include a power management integrated circuit (PMIC), a charger IC, a battery gauge, and the like.

The PMIC may be implemented in the form of an IC chip or SoC. Charging electric power may be performed in wired and/or wireless modes. The charger IC may charge a battery, and prevent input over-voltage or input over-current to the battery from a charger. In an embodiment of the present disclosure, the charger IC may be implemented with a wired charging type and/or a wireless charging type. Examples of the wireless charging type of the charger IC are a magnetic resonance type, a magnetic induction type, an electromagnetic type, an acoustic type, and the like. If the charger IC is implemented with a wireless charging type, it may also include an additional circuit for wireless charging, e.g., a coil loop, a resonance circuit, a rectifier, and the like.

The battery gauge may measure a residual charge amount of the battery 296, a level of voltage, a level of current, a temperature during the charge, and the like. The battery 296 stores electric power and supplies it to the electronic device 201. The battery 296 may include a rechargeable battery or a solar battery.

The indicator 297 shows states of the electronic device 201 or of the parts thereof (e.g., the AP 210), e.g., a booting state, a message state, a recharging state, and the like. The motor 298 converts an electrical signal into a mechanical vibration. The electronic device 201 may include a processor for supporting a mobile TV, e.g., a GPU. The mobile TV supporting processor may process media data that complies with standards of digital multimedia broadcasting (DMB), digital video broadcasting (DVB), Mediaflo™, and the like.

Each of the elements/units of the electronic device according to an embodiment of the present disclosure may be implemented with one or more components, and may be called different names according to types of electronic devices. The electronic device may include at least one element described above. The electronic device may also be modified in such a way as to remove part of the elements or include new elements. In addition, the electronic device may also be modified such that parts of the elements are integrated into one entity that performs their original functions.

In the present disclosure, the term 'module' may refer, for example, to a 'unit' including hardware, software, firmware or a combination thereof. The term 'module' may be interchangeably used with the terms 'unit,' logic,'logical block,' 'component,' 'circuit,' and the like. A 'module' may be the least identifiable unit or part of an integrated component. A 'module' may also be the least unit or part thereof that may perform one or more functions of the module. A 'module' may be implemented through mechanical or electronic modes. For example, 'modules' according to an example embodiment of the present disclosure may be implemented with at least one of a dedicated processor, a CPU, an application specific integrated circuit (ASIC) chip, a field-programmable gate array (FPGAs) and a programmable-logic device that may perform functions that are known or will be developed.

Figure 3:
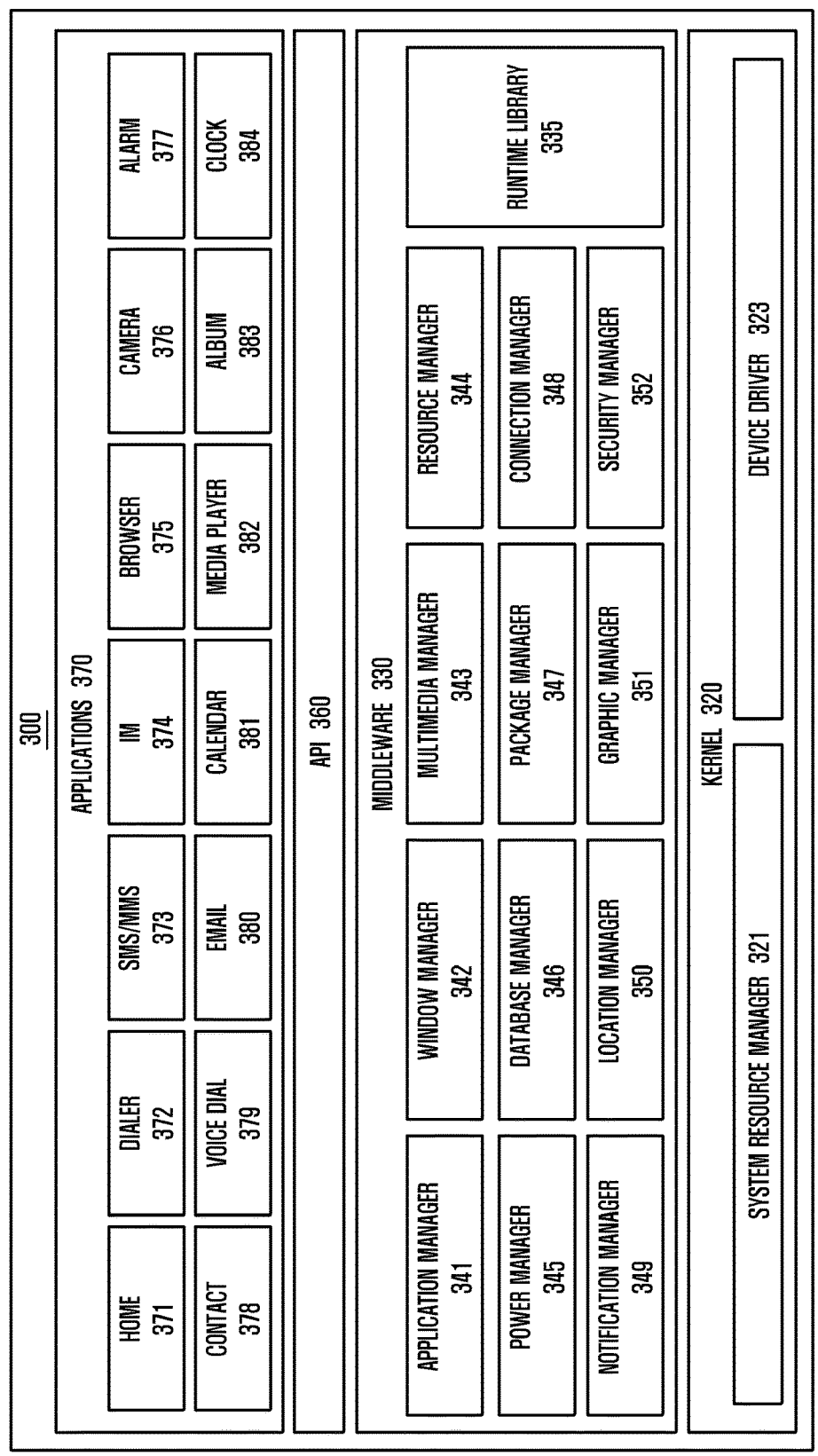
FIG. 3 is a block diagram illustrating an example program module according to various example embodiments of the present disclosure.

FIG. 3 is a block diagram illustrating an example program module according to an example embodiment of the present disclosure.

Referring to FIG. 3, a program module 300 may include an operating system (OS) for controlling resources related to the electronic device and/or various applications executed in the operating system. The OS may be, for example, Android™, iOS™, Windows™, Symbian®, Tizen®, Bada®, and the like.

The program module 300 includes a kernel 320, middleware 330, an API 360, and/or applications 370. At least some of the program module 300 may be preloaded on an electronic device, or may be downloaded from the electronic device 102 or 104, or the server 106.

The kernel 320 includes, for example, a system resource manager 321 and/or a device driver 323. The system resource manager 321 may perform control, allocation, retrieval, and the like, of system resources. The system resource manager 321 may include a process manager, memory manager, file system manager, and the like. The device driver 323 may include, for example, a display driver, camera driver, BT driver, shared memory driver, USB driver, keypad driver, Wi-Fi driver, audio driver, or inter-process communication (IPC) driver.

The middleware 330 may provide a function required by the applications 370 in common, or provide various functions to the applications 370 through the API 360 so that the applications 370 may efficiently use limited system resources within the electronic device. According to an embodiment of the present disclosure, the middleware 330 includes, for example, at least one of a runtime library 335, an application manager 341, a window manager 342, a multimedia manager 343, a resource manager 344, a power manager 345, a database manager 346, a package manager 347, a connectivity (connection) manager 348, a notification manager 349, a location manager 350, a graphic manager 351, and a security manager 352.

The runtime library 335 may include a library module which a compiler uses in order to add a new function through a programming language while the applications 370 are being executed. The runtime library 335 may perform I/O management, memory management, functionality for an arithmetic function, and the like.

The application manager 341 may manage, for example, a life cycle of at least one of the applications 370. The window manager 342 may manage graphical user interface (GUI) resources used for the screen. The multimedia manager 343 may determine a format required to reproduce various media files, and may encode or decode a media file by using a coder/decoder (codec) appropriate for the corresponding format. The resource manager 344 may manage resources such as a source code, memory, and storage space of at least one of the applications 370.

The power manager 345 may operate together with a basic input/output system (BIOS) to manage a battery or other power, and may provide power information required for the operation of the electronic device. The database manager 346 may generate, search for, and/or change a database to be used by at least one of the applications 370. The package manager 347 may manage the installation or update of an application distributed in the form of a package file.

The connection (connectivity) manager 348 may manage a wireless connection such as, for example, Wi-Fi or BT. The notification manager 349 may display or notify of an event, such as an arrival message, appointment, proximity notification, and the like, in such a manner as not to disturb the user. The location manager 350 may manage location information of the electronic device. The graphic manager 351 may manage a graphic effect, which is to be provided to the user, or a user interface related to the graphic effect. The security manager 352 may provide various security functions required for system security, user authentication, and the like. According to an embodiment of the present disclosure, when the electronic device has a telephone call function, the middleware 330 may further include a telephony manager for managing a voice call function or a video call function of the electronic device.

The middleware 330 may include a middleware module that forms a combination of various functions of the above-described elements. The middleware 330 may provide a module specialized for each type of OS in order to provide a differentiated function. In addition, the middleware 330 may dynamically delete some of the existing elements, or may add new elements as required.

The API 360 is, for example, a set of API programming functions, and may be provided with a different configuration according to an OS. For example, in the case of Android™ or iOS™, one API set may be provided for each platform. In the case of Tizen™, two or more API sets may be provided for each platform.

The applications 370 includes, for example, one or more applications which may provide functions such as home 371, dialer 372, SMS/MMS 373, instant message (IM) 374, browser 375, camera 376, alarm 377, contacts 378, voice dialer 379, email 380, calendar 381, media player 382, album 383, clock 384. Additionally, though not shown, the applications 370 may include applications related to, for example, health care (e.g., measure exercise quantity or blood sugar level), or environment information (e.g., atmospheric pressure, humidity, or temperature information).

According to an embodiment of the present disclosure, the applications 370 may include an information exchange application supporting information exchange between the electronic device and an external electronic device 102 or 104. The information exchange application may include, for example, a notification relay application for transferring specific information to an external electronic device or a device management application for managing an external electronic device.

The notification relay application may include a function of transferring, to the external electronic device 102 or 104, notification information generated from other applications of the electronic device 101 (e.g., an SMS/MMS application, e-mail application, health management application, or environmental information application). Further, the notification relay application may receive notification information from, for example, an external electronic device and provide the received notification information to a user.

The device management application may manage (e.g., install, delete, or update), for example, at least one function of an external electronic device 102 or 104 communicating with the electronic device (e.g., a function of turning on/off the external electronic device or some components thereof, or a function of adjusting luminance or a resolution of the display), applications operating in the external electronic device, or services provided by the external electronic device (e.g., a call service and a message service).

According to an embodiment of the present disclosure, the applications 370 may include an application (e.g., a health care application of a mobile medical device and the like) designated according to an attribute of the external electronic device 102 or 104. The applications 370 may include an application received from the server 106, or the external electronic device 102 or 104. The applications 370 may include a preloaded application or a third party application which may be downloaded from the server. Names of the elements of the program module 300, according to the above-described embodiments of the present disclosure, may change depending on the type of OS.

Hereinafter, a location recognition method and an electronic device that implements the method according to various example embodiments of the present disclosure will be described in greater detail with reference to FIGS. 4 to 16.

Figure 4:
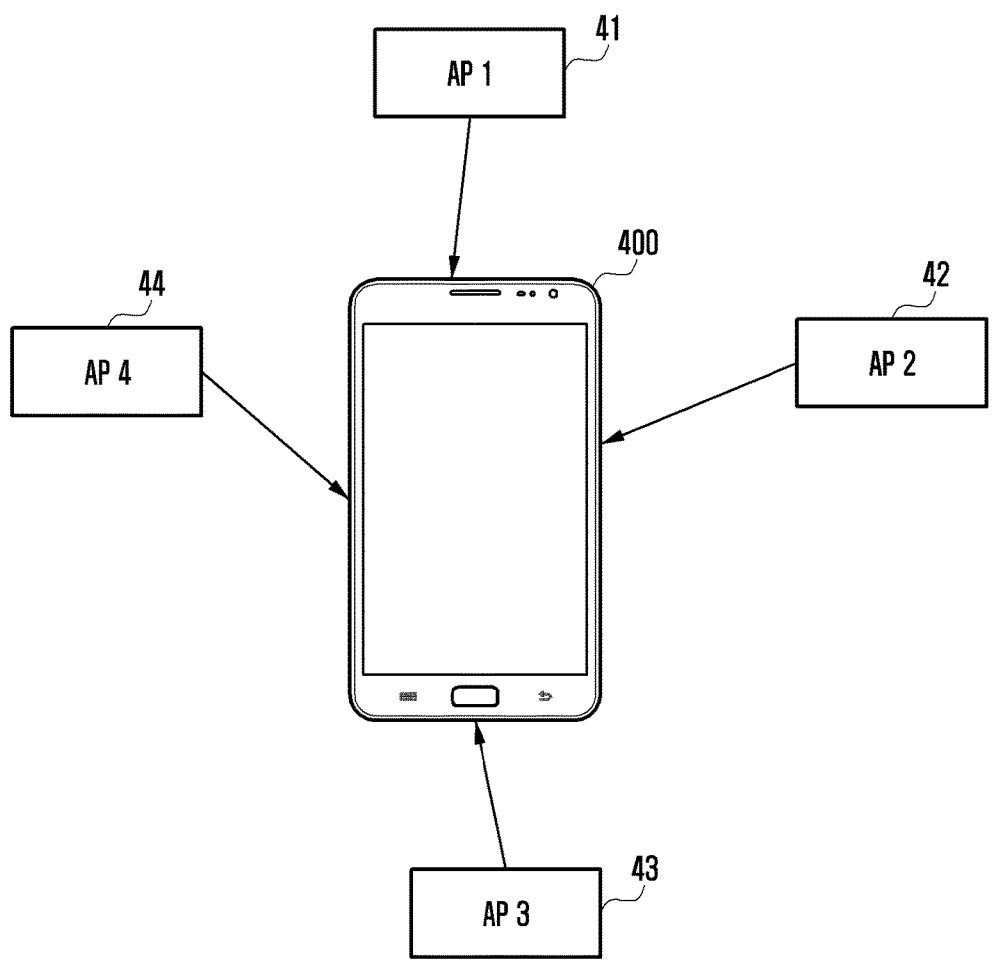
FIG. 4 is a diagram illustrating an example system for recognizing a location of an electronic device according to various example embodiments of the present disclosure.

FIG. 4 is a diagram illustrating an example system for recognizing a location of an electronic device according to various example embodiments of the present disclosure.

Referring to FIG. 4, the system may include a plurality of access point (AP) devices 41, 42, 43 and 44 and an electronic device 400. The individual respective AP devices 41, 42, 43 and 44 are installed in various places and may provide an Internet service using short-range wireless communication (e.g., Wi-Fi).

The electronic device 400 may include a communication interface for accessing a wired Internet through the AP devices 41, 42, 43 and 44 and then using the Internet service. The communication interface may include, for example, the communication interface 170 as illustrated in FIG. 1. The electronic device 400 may communicate with each of the AP devices 41, 42, 43 and 44 to receive information from each of the AP devices 41, 42, 43 and 44. The received information will be referred to as AP information.

The operation of processing the AP information at the electronic device according to various example embodiments of the present disclosure will be described in greater detail below.

Figure 5:
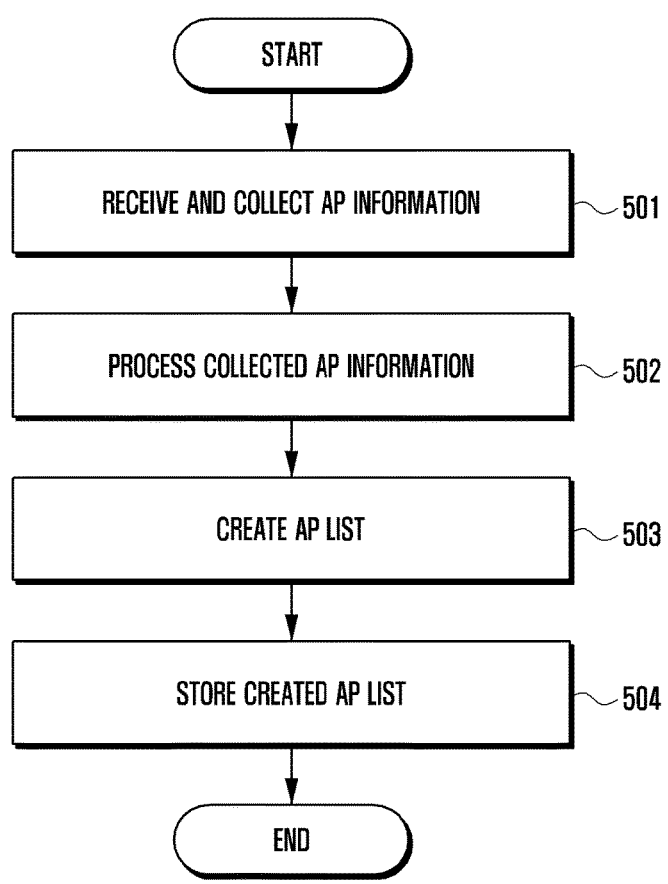
FIG. 5 is a flowchart illustrating an example process of setting a specific location according to various example embodiments of the present disclosure.

FIG. 5 is a flowchart illustrating an example process of setting a specific location according to various example embodiments of the present disclosure.

Processes illustrated in FIGS. 5 to 8 are performed on the assumption that the electronic device does not move. On the other hand, a process of setting a specific location in case where the electronic device moves will be described in greater detail below with reference to FIG. 13.

Referring to FIG. 5, at operation 501, the electronic device may receive and collect AP information from each of a plurality of AP devices installed nearby the electronic device as illustrated in FIG. 4. Particularly, the electronic device may collect the AP information from the AP devices for a predetermined time (e.g., for 4 hours or more). The collected AP information may be plural with regard to each AP device.

The AP information collected by the electronic device may include a service set identifier (SSID) as a unique value of the AP device, a signal strength, and a timestamp. The SSID may refer to a network name that is a unique value of the AP device. The signal strength may refer to the strength of a signal, e.g., a Wi-Fi signal, received from the AP device. The timestamp may be a string that represents the time at which the signal is received. In one embodiment, two or more pieces of AP information may be received from the first AP device (AP1) for a given time. Each piece of AP information may include the strength of a signal received at the time indicated by the timestamp and the SSID of the first AP device (AP1) that sends the signal.

At operation 502, the electronic device may process the collected AP information. Specifically, the electronic device may calculate (determine) a mean value (e.g., an average value) and a standard deviation (STD) value with regard to the strength of signals received for a given time on the basis of the SSID in the collected AP information. For example, the electronic device may obtain the mean value (M1) and the standard deviation value (STD1) of the strength values of signals received for a given time, based on the SSID indicating the first AP device (AP1), among the collected information. Further, the electronic device may calculate a variation of the signal strength received for a given time from the AP device indicated by each SSID, based on the collected AP information.

At operation 503, the electronic device may create an AP list. Namely, as a result of processing the AP information, the electronic device may create the AP list having the mean value and the STD value of the signal strength obtained based on the SSID. The AP list may include variation data of the signal strength of the SSID stored and matched with the SSID.

At operation 504, the electronic device may store the created AP list. Namely, the electronic device may store the AP list in a memory thereof (e.g., the memory 130 in FIG. 1). Hereinafter, the AP list will be considered as including the SSID and information matched with the SSID. In addition, the information matched with the SSID will be considered as including the mean value, the STD value, and the variation data of the signal strength received from the AP device indicated by the SSID.

According to various embodiments, when processing the AP information to create the AP list, the electronic device may process frequently collected AP information only, based on the SSID, rather than process the whole collected AP information. For example, if five pieces of AP information are collected with regard to SSID "f4:d9:fb:34:5f:e2", if four pieces of AP information are collected with regard to SSID "f4:d7:fb:31:5f:e3", and if one piece of AP information is collected with regard to SSID "20:e5:fb:3a:5f:e2", only nine pieces of AP information regarding SSIDs "f4:d9:fb:34:5f:e2" and "f4:d7:fb:31:5f:e3" may be processed.

Figure 6:
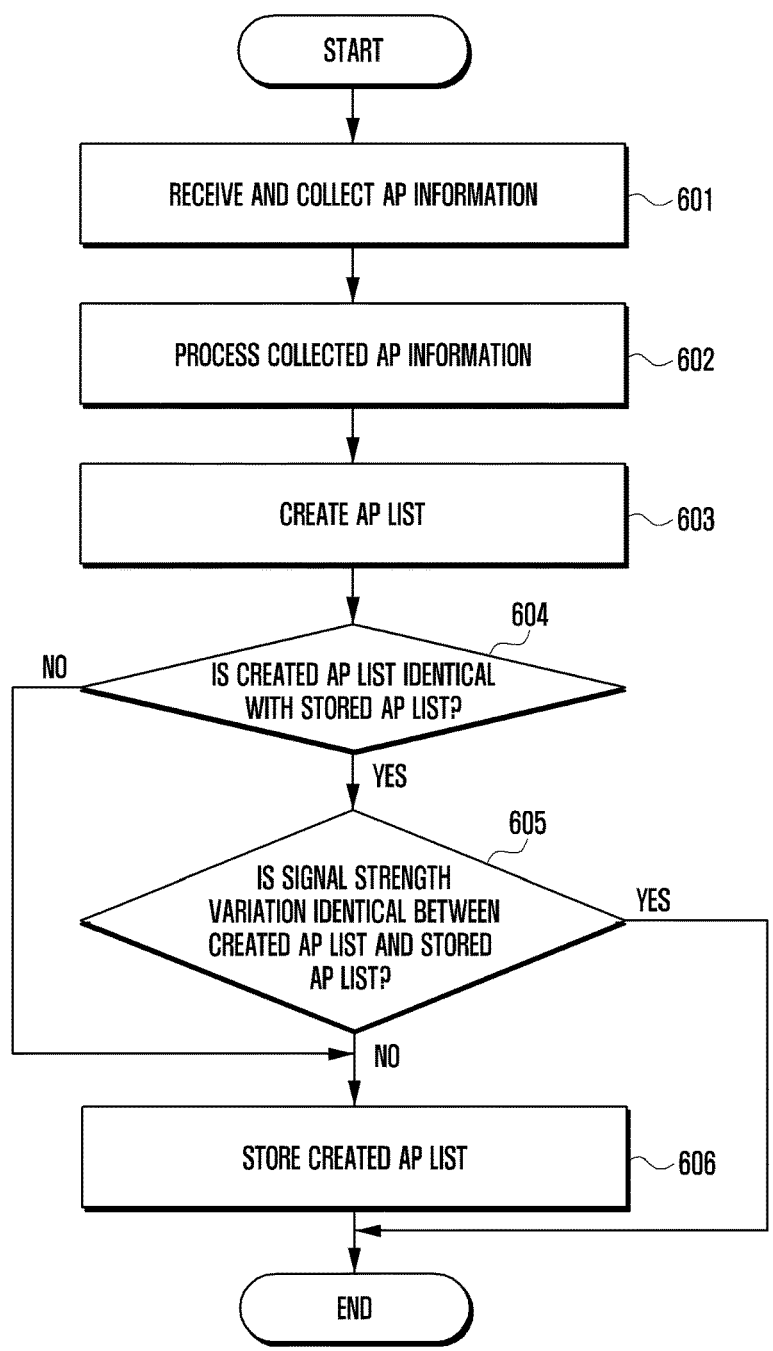
FIG. 6 is a flowchart illustrating an example process of resetting a specific location according to various example embodiments of the present disclosure.

FIG. 6 is a flowchart illustrating an example process of resetting a specific location according to various example embodiments of the present disclosure.

Before describing FIG. 6, it is assumed that the AP information received from the AP device by the electronic device is varied according to changes in environment and thus the stored AP list may be checked at every given time. Also, it is assumed that the AP list is already stored in the electronic device.

Referring to FIG. 6, at operation 601, the electronic device may receive and collect AP information from each of a plurality of AP devices installed nearby the electronic device as illustrated in FIG. 4. Particularly, the electronic device may collect the AP information from the AP devices for a predetermined time (e.g., for 4 hours or more). The collected AP information may be plural with regard to each AP device.

At operation 602, the electronic device may process the collected AP information. Specifically, the electronic device may calculate the mean value and the standard deviation (STD) value with regard to the strength of signals received for a given time on the basis of the SSID in the collected AP information. Further, the electronic device may calculate the variation of the signal strength received for a given time from the AP device indicated by each SSID, based on the collected AP information.

At operation 603, the electronic device may create an AP list. Namely, as a result of processing the AP information, the electronic device may create the AP list having the SSID and also having the mean value and the standard deviation value both of which are matched with the SSID. The AP list may include the variation data of the signal strength of the SSID stored and matched with the SSID.

At operation 604, the electronic device may compare the created AP list with a pre-stored AP list. In an example embodiment, the SSID may be compared between the created AP list and the pre-stored AP list. For example, if the created AP list has a predetermined number of SSIDs or more differing from those of the pre-stored AP list, the created AP list may be determined to be different from the pre-stored AP list. In another example, if the created AP list has at least one SSID differing from that of the pre-stored AP list, the created AP list may be determined to be different from the pre-stored AP list.

If it is determined, as a result of comparison, that the created AP list is not different from the pre-stored AP list, operation 605 will be performed. If it is determined that the created AP list is different from the pre-stored AP list, operation 606 will be performed.

At operation 605, the electronic device may compare the signal strength variation regarding the same AP device included in both the created AP list and the pre-stored AP list. The signal strength variation regarding the AP device may include a variation in strength of signals received from the AP device. With regard to the SSID, which is identical with the SSID in the pre-stored AP list, among SSIDs indicating the AP devices in the created AP list, the electronic device may compare variations in strength of signals received for a given time. In one embodiment, with regard to a specific SSID "f4:d9:fb:34:5f:e2" which is the same SSID between the created AP list and the pre-stored AP list, the variations in strength of signals received for a given time may be compared. If the created AP list has the signal strength variation differing from that of the pre-stored AP list with regard to the specific same SSID, operation 606 will be performed.

In another embodiment, the created AP list may have a mean value 68 and an STD value 5 with regard to the specific SSID, and the pre-stored AP list may have a mean value 17 and an STD value 4 with regard to the specific SSID. Since the created AP list and the pre-stored AP list have different mean values and different STD values with regard to the specific same SSID, operation 606 will be performed.

At operation 606, the electronic device may store the created AP list. Namely, the created AP list may replace the pre-stored AP list to update the AP list. The SSID contained in the newly created AP list and any information matched with the SSID, e.g., mean, STD and variation of signal strength received from the AP device indicated by the SSID, may be updated feature information that indicates the location of the electronic device. By periodically updating the AP list as shown in FIG. 6, it is possible to prevent and/or reduce the degradation of a location recognition rate due to changes in environment.

Figure 7:
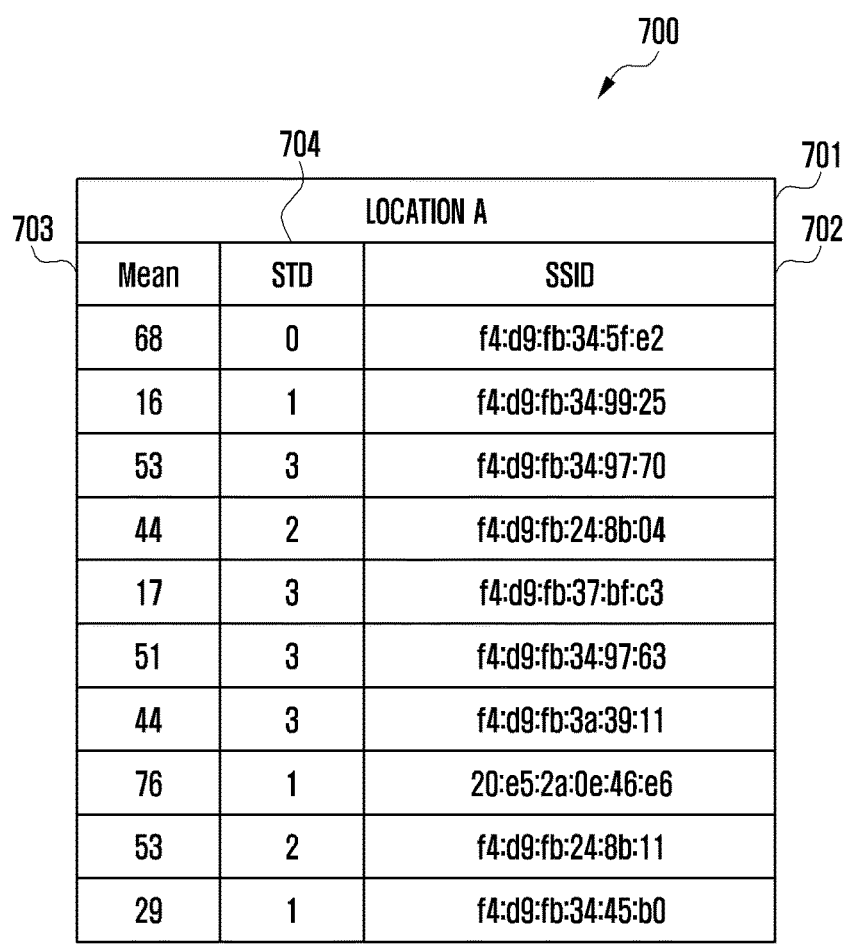
FIG. 7 is a diagram illustrating an example access point list according to various example embodiments of the present disclosure.

FIG. 7 is a diagram illustrating an example access point list according to various example embodiments of the present disclosure.

Referring to FIG. 7, an AP list 700 may be created by the electronic device that receives and processes AP information from nearby AP devices at a specific location A 701 for a given time. The AP list 700 may include an SSID 702 indicating each AP device, a mean value 703 of signal strength received from each AP device, and an STD value 704 of signal strength received from each AP device with regard to the specific location A 701. For example, as seen from the AP list 700, the electronic device placed at the location A 701 receives signals from an AP device having the SSID "f4:d9:fb:34:5f:e2" and the received signal strength has a mean value 68 and an STD value 0.

Hereinafter, a process of determining whether the electronic device arrives at a specific location and thereby processing a particular function will be described in greater detail.

Figure 8:
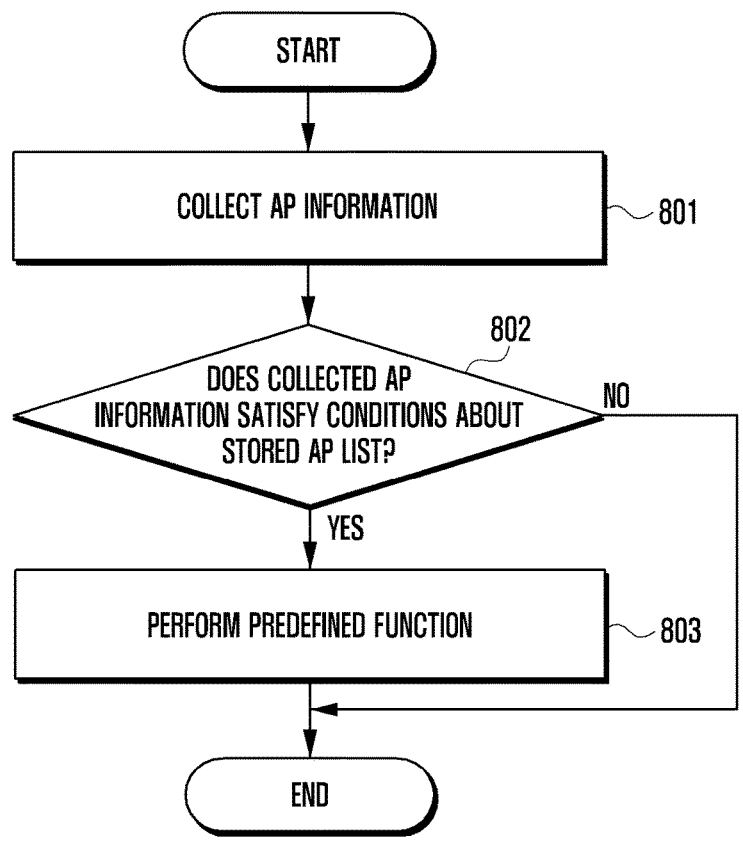
FIG. 8 is a flowchart illustrating an example process of determining whether an electronic device arrives at a specific location according to various example embodiments of the present disclosure.

FIG. 8 is a flowchart illustrating an example process of determining whether an electronic device arrives at a specific location according to various example embodiments of the present disclosure.

Referring to FIG. 8, at operation 801, the electronic device may collect AP information from a plurality of nearby AP devices for a predetermined time. A location at which the electronic device collects the AP information is a location at which the electronic device is positioned. Since the location of the electronic device is not known yet, the location is set up as an arbitrary location.

At operation 802, the electronic device may determine whether the AP information collected at the arbitrary location satisfies conditions about the AP list previously stored in the electronic device.

In various embodiments, the conditions may indicate that a predetermined number of SSIDs or more contained in the AP information collected at the arbitrary location should be identical with SSIDs recorded in the pre-stored AP list (hereinafter, a first condition), and that the collected AP information should have signal strength corresponding to SSIDs of the pre-stored AP list within a range defined based on the mean value and the STD value matched with each SSID in the pre-stored AP list (hereinafter, a second condition).

Now, the first and second conditions will be described by way of example. In one embodiment, the AP information collected at an arbitrary location may have SSIDs A, B, C and D. Although the SSID is defined as a 12-digit hexadecimal address (e.g., f4:d7:fb:31:5f:e3), it will be simplified herein as a single alphabet for the sake of clarity. Let's suppose that signal strength values of SSID A, SSID B, SSID C and SSID D are 15, 52, 41 and 20, respectively.

Let's further suppose that the pre-stored AP list has SSID A, SSID B, SSID C, SSID E, SSID F, SSID G, and SSID H. In this case, by comparing the SSIDs contained in the AP information collected at the arbitrary location with the SSIDs recorded in the pre-stored AP list, SSID A, SSID B and SSID C are the same SSID. If the predetermined number of SSIDs denoted in the first condition is three, the first condition is satisfied in this case.

Also, let's suppose that SSID A among the SSIDs recorded in the pre-stored AP list is matched with a mean value 17 and an STD value 3. In this case, the signal strength corresponding to SSID A should be within the range of 14 to 20 (i.e., 17 minus 3 to 17 plus 3) in order to satisfy the second condition. As mentioned above, the signal strength of SSID A contained in the AP information corresponding to the arbitrary location is 15, and thus the second condition is satisfied. Similarly, SSID B among the SSIDs in the pre-stored AP list may be matched with a mean value 51 and an STD value 3. In this case, the signal strength corresponding to SSID B should be within the range of 48 to 54 (i.e., 51 minus 3 to 51 plus 3) in order to satisfy the second condition. As mentioned above, the signal strength of SSID B in the AP information corresponding to the arbitrary location is 52, and thus the second condition is satisfied. Similarly, SSID C among the SSIDs in the pre-stored AP list may be matched with a mean value 44 and an STD value 3. In this case, the signal strength corresponding to SSID C should be within the range of 41 to 47 (i.e., 44 minus 3 to 44 plus 3) in order to satisfy the second condition. As mentioned above, the signal strength of SSID C in the AP information corresponding to the arbitrary location is 41, and thus the second condition is satisfied.

Since the second condition is satisfied with regard to all SSIDs which are identical with the SSIDs recorded in the pre-stored AP list, the electronic device may determine that the collected AP information satisfies the conditions about the pre-stored AP list.

If it is determined at operation 802 that the collected AP information satisfies the conditions about the pre-stored AP list, the electronic device may perform operation 803. At operation 803, the electronic device may determine that the arbitrary location is identical with a specific location, and then may perform a predefined function when arriving at the specific location.

If it is determined at operation 802 that the collected AP information fails to satisfy the conditions about the pre-stored AP list, the electronic device may terminate the process. In order to determine that the conditions are satisfied, the electronic device may determine whether all of the first and second conditions are satisfied, or whether at least one of the first and second conditions is satisfied. The above discussion is an example of the former case.

Now, a process of performing a predefined function when the electronic device reaches a specific location will be described in detail.

According to various embodiments, predefined functions, e.g., the functions performed by the electronic device may vary. Such functions may be defined by the user and stored to be matched with the stored AP list. The stored AP list may refer to a specific location defined by the user, and the matched function may mean a function defined to be performed when a specific location is reached.

According to various example embodiments, when the user approaches a specific location, the predefined function of the electronic device may be performed. In an example embodiment, when the user approaches his or her seat in the company, the electronic device may automatically read an unread mail delivered from an important sender in a frequently used email account. In another embodiment, the electronic device may display an unread mail in a popup form. In still another embodiment, if the user approaches his or her seat in the company, the electronic device may check whether there is any schedule, and if so, notify the schedule to the user in various ways.

According to various embodiments, the user may set up the location of a bed in a house as a specific location. When the user approaches the bed, the electronic device may execute an alarm application.

The electronic device may be set up to perform a function associated with an external electronic device that communicates with the electronic device, as well as a function performed within the electronic device. The electronic device may communicate with the external electronic device through a wired/wireless Internet, a mobile communication network, a mobile WiMAX (e.g., Wibro), and the like. In one embodiment, when the user approaches his or her seat within the company, a user's portable electronic device may transmit a command to a desktop or laptop, which is the external electronic device, such that the desktop or laptop displays a recent working document. Then the external device may receive and execute the command.

In another embodiment, if the user is out of his/her seat, the portable electronic device may transmit a command to the external electronic device such that the external electronic device enters a sleep mode or a lock mode. Then the external electronic device may receive and execute the command.

According to various embodiments, the user may set up the function with regard to a specific time as well as a specific location. In one example, if the user approaches a bed which is set up as a specific location, and if the current time is a specific time which is set up by the user to perform a certain function (e.g., a notification of having to take medicine), the electronic device may display such a notification.

Among various functions performed by the electronic device, the function of communicating with the external electronic device will be described hereinafter as an embodiment.

Figure 9A:
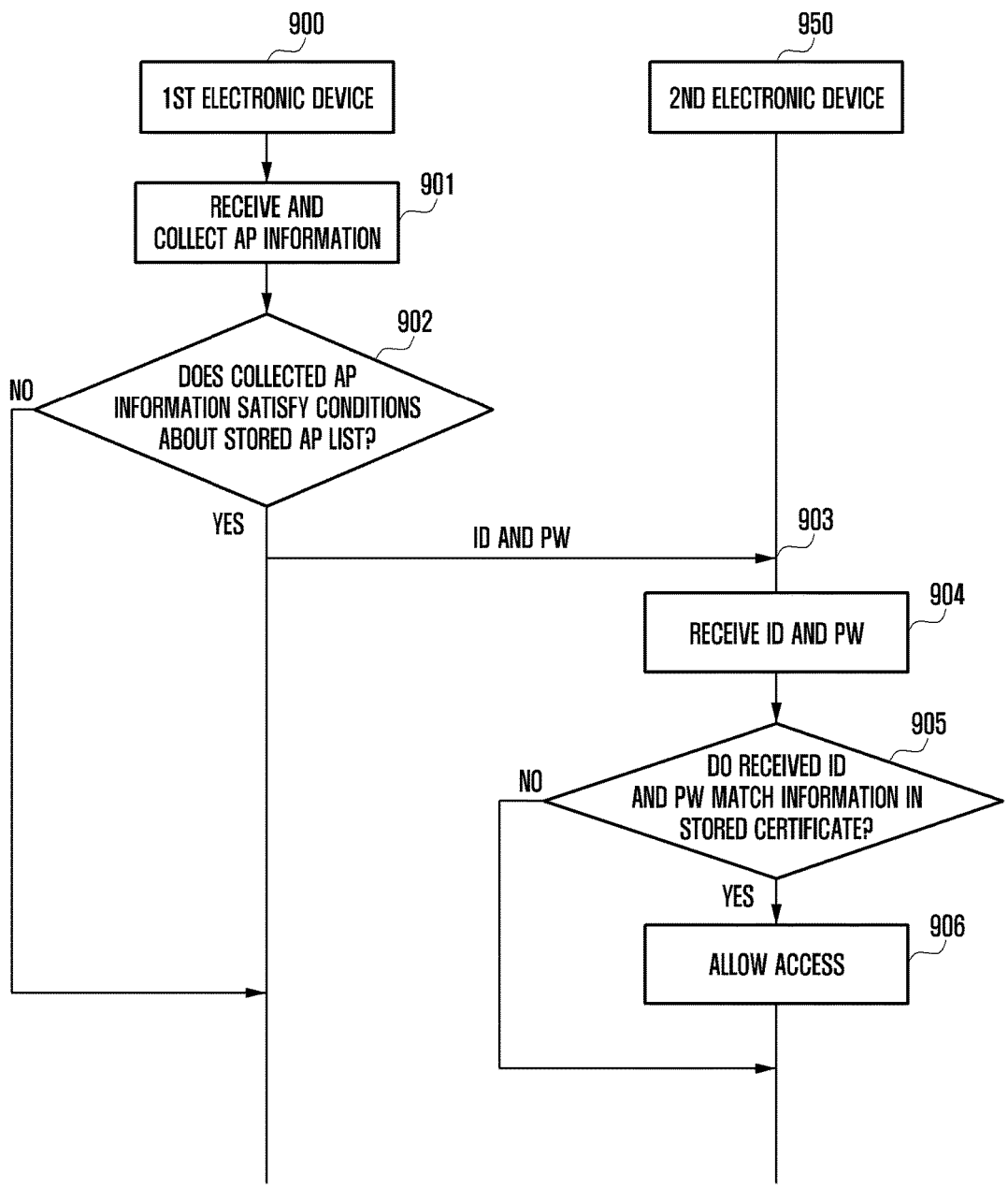
FIG. 9A is a flowchart illustrating an example process of performing a particular function at a specific location according to various example embodiments of the present disclosure.
Figure 9B:
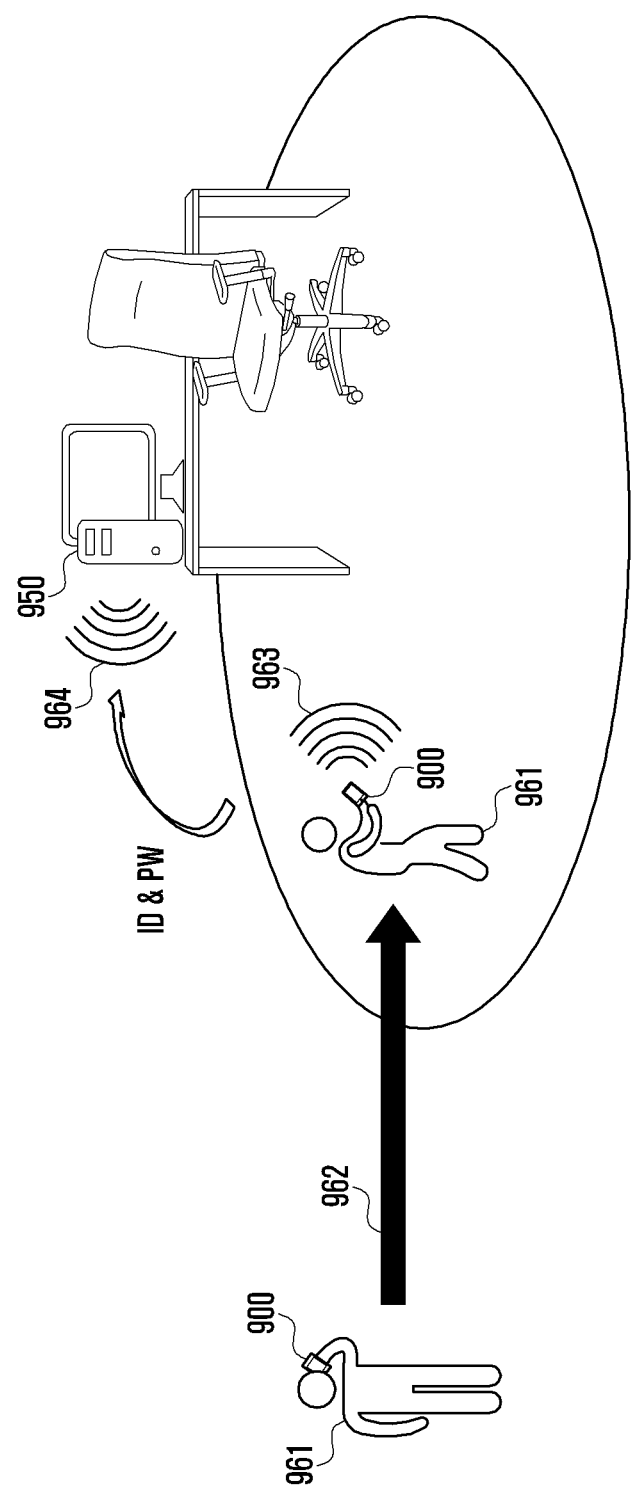
FIG. 9B is a diagram illustrating an example of performing a particular function at a specific location according to various example embodiments of the present disclosure.

FIG. 9A is a flowchart illustrating an example process of performing a particular function at a specific location according to various embodiments of the present disclosure. FIG. 9B is a diagram illustrating an example of performing a particular function at a specific location according to various example embodiments of the present disclosure.

Referring to FIG. 9A, the electronic device may perform communication with an external electronic device. Herein, the electronic device is referred to as a first electronic device 900, and the external electronic device is referred to as a second electronic device 950. The first electronic device 900 and the second electronic device 950 may communicate with each other through a wired/wireless Internet, a mobile communication network, a mobile WiMAX (e.g., Wibro), and the like. For example, the first and second electronic devices 900 and 950 may perform Wi-Fi communication via UDP protocol.

At operation 901, the first electronic device 900 may receive and collect AP information from each of a plurality of AP devices installed nearby as illustrated in FIG. 4. The first electronic device 900 may collect the AP information from each of the nearby AP devices for a given time. The collected AP information may be plural with regard to each nearby AP device. For example, the first electronic device 900 may collect the AP information for four hours or more from each nearby AP device. At operation 902, the first electronic device 900 may determine whether the collected AP information satisfies conditions about a AP list. This determination operation corresponds to the above-discussed operation 802 in FIG. 8.

If it is determined at operation 902 that the AP information collected by the first electronic device 900 satisfies the conditions about the stored AP list, the first electronic device 900 may transmit an ID and a password to the second electronic device 950 at operation 903. In one embodiment, the ID and the password may be encrypted based on the base 64 algorithm. Then, at operation 904, the second electronic device 950 may receive the ID and the password from the first electronic device 900.

Referring to FIG. 9B, a user 961 who carries the first electronic device 900 may approach, as indicated by a reference numeral 962, a particular area where the second electronic device 950 is located. In this situation 962, the first electronic device 900 may receive and collect AP information from each of AP devices, compare the AP information with a pre-stored AP list, and determine whether a condition about the pre-stored AP list is satisfied. If it is determined that the condition is satisfied, the first electronic device 900 may transmit an ID and a password to the second electronic device 950 as indicated by a reference numeral 963, and then the second electronic device 950 may receive the ID and the password as indicated by a reference numeral 964.

At operation 905, the second electronic device 950 may determine that the received ID and password are matched with information in a certificate stored in the second electronic device 950. If it is determined as being matched at operation 905, the second electronic device 950 may allow access at operation 906. According to an example embodiment, allowing access may refer, for example, to unlocking the locked second electronic device 950 to permit a use of the second electronic device 950.

According to various embodiments, a process of the second electronic device 950 to receive the ID and the password from the first electronic device 900 and then authorize the access to the second electronic device 950 may include a procedure performed within a credential system based on the Window OS of the second electronic device 950. According to various embodiments, the second electronic device 950 may require the first electronic device 900 to be placed at a specific location, e.g., a communicatable position with the second electronic device 950, as a prerequisite for receiving the ID and the password from the first electronic device 900 for user authentication. The second electronic device 950 may receive the ID and the password through a credential provider from the first electronic device 900 that satisfies the above condition, and then perform user authentication through a local security authority (LSA) as a subsystem. Since this credential system is well known in the art, a detailed description thereof will be omitted.

Figure 10:
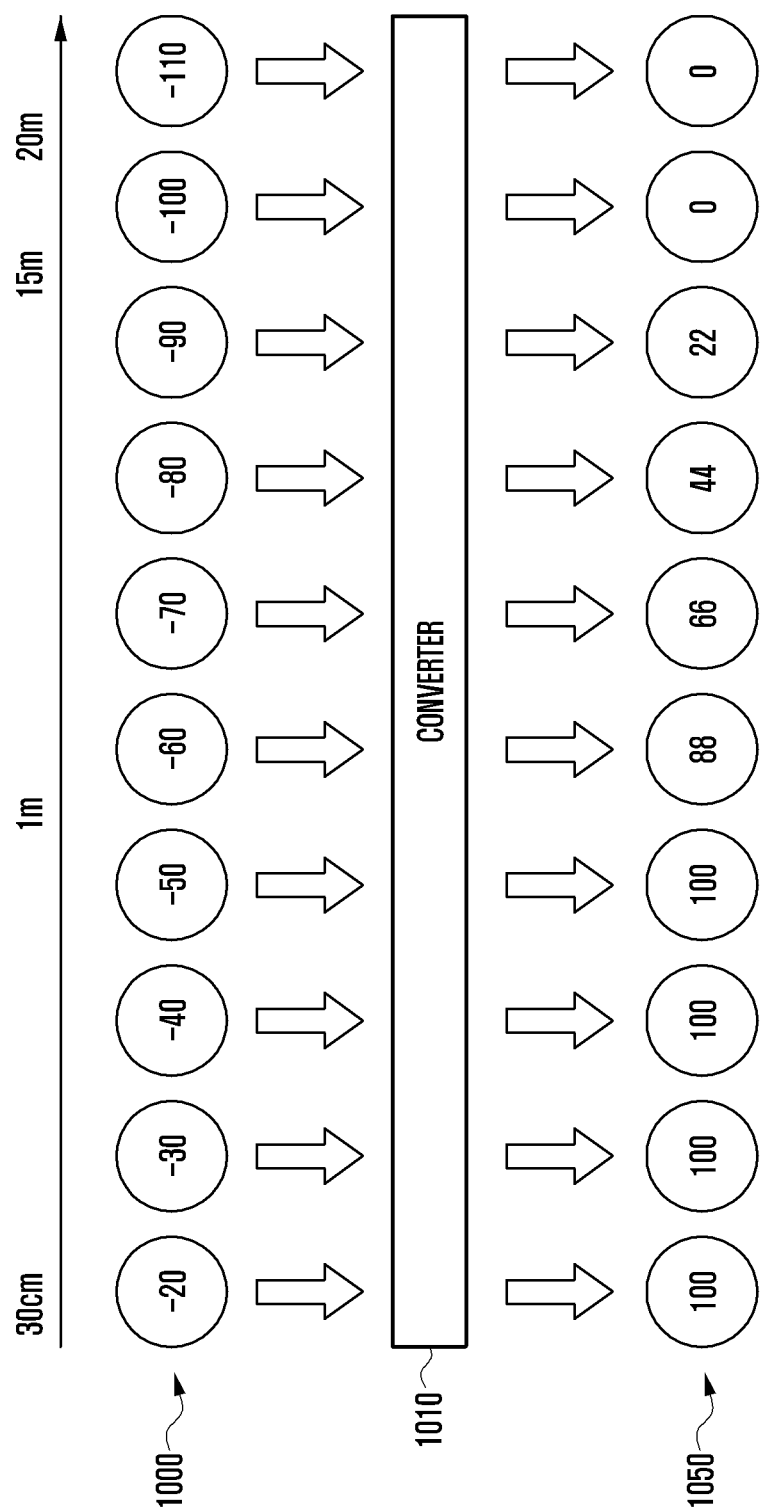
FIG. 10 is a diagram illustrating an example method for improving the accuracy of location recognition according to various example embodiments of the present disclosure.

FIG. 10 is a diagram illustrating an example method for improving the accuracy of location recognition according to various example embodiments of the present disclosure.

The electronic device may receive signals from the AP devices. The signals received by the electronic device, such as Wi-Fi signals, may have nonlinear characteristics. Signals with nonlinear characteristics are highly variable and may have a significant impact on the recognition of a distance between the AP device and the electronic device. In one embodiment, the electronic device placed at a location A may receive signals having different strength from each of first, second and third AP devices which are respectively 30 cm, 50 cm and 1 m away from the location A of the electronic device. Then the electronic device may move to a new location B and receive signals having different strength from each of the first, second and third AP devices which are respectively 1 m, 50 cm and 30 cm away from the location B of the electronic device. Therefore, the AP information received at the location A and the AP information received at the location B may be different from each other. In this case, the electronic device may be recognized as being placed at a new location differing from the previous location even if moving only by 30 cm. Namely, there may be a problem that the electronic device may recognize the location thereof with a low accuracy.

According to various embodiments, the accuracy of recognizing the location of the electronic device may be improved by linearly converting signals having nonlinear characteristics. In one embodiment, the electronic device having the Non-Linearity to Linear converter may linearly convert a strength value of a signal received from the AP device and recognize the converted signal strength value as one of the AP information.

Referring to FIG. 10, in an example embodiment, numerical values indicated by a reference numeral 1000 may denote the strength of signals received from the AP device based on distance. From such numerical values, it can be seen that the signal strength is varied according as a distance between the electronic device and the AP device changes from 30 cm to 20 m.

In an example embodiment, numerical value indicated by a reference numeral 1050 may denote values obtained by converting the signals received from the AP device by using a converter (e.g., including converting circuitry and/or program elements) 1010. The converted values 1050 may be characterized by the same numerical value even if the distance between the electronic device and the AP device changes from 30 cm to 1 m. Although the strength of signals received from AP devices apart from 30 cm to 1 m is actually different, such signal strength may be converted into the same value. Then the electronic device may be recognized as being placed at the same location even if moving within 30 cm to 1 m. This can improve the accuracy of the location recognition of the electronic device. In one embodiment, the converter 1010 may be included as a separate module in the electronic device, or not included as a separate module when an algorithm to linearize signals in converting signals is used.

In another embodiment, the electronic device may perform a normalization technique in converting the strength values of signals received from the AP device. Through the normalization technique, the electronic device may modify the signal strength according to a certain rule such that the signal strength can be easily used as AP information. The normalization technique may process signals received from the AP device so as to output the same numerical value within a certain distance.

Hereinafter, it will be described in detail how the number of AP devices and the number of times of receiving signals from the AP device affect the accuracy of location recognition of the electronic device in various embodiments.

Figure 11:
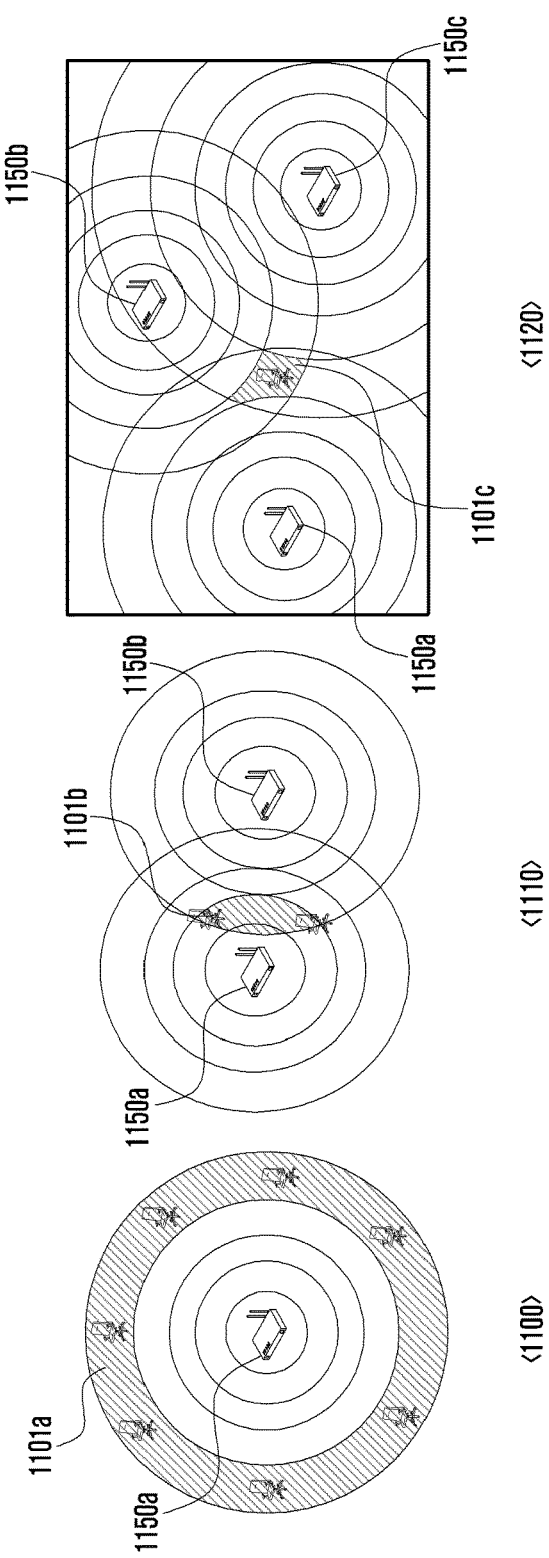
FIG. 11 is a diagram illustrating example differences in the accuracy of location recognition depending on the number of access points according to various embodiments of the present disclosure.

FIG. 11 is a diagram illustrating example differences in the accuracy of location recognition depending on the number of access points according to various example embodiments of the present disclosure. FIG. 11 shows three examples 1100, 1110 and 1120 in which a region capable of recognizing a location is varied according to the number of AP devices and thus the recognition accuracy is also varied according to the number of AP devices.

Referring to FIG. 11, in the first example 1100, a region receiving a signal from the first AP device 1150a is denoted as a reference numeral 1101a. The electronic device that receives a signal from the first AP device 1150a may recognize the location thereof as being within the region 1101a. In the second example 1110, a region receiving signals from the first AP device 1150a and the second AP device 1150*b* is denoted as a reference numeral 1101*b*. The electronic device that receives signals from the first and second AP devices 1150*a* and 1150*b* may recognize the location thereof as being within the region 1101*b*. In the third example 1120, a region receiving signals from the first AP device 1150*a*, the second AP device 1150*b*, and the third AP device 1150*c* is denoted as a reference numeral 1101*c*. The electronic device that receives signal from the first, second and third AP devices 1150*a*, 1150*b* and 1150*c* may recognize the location thereof as being within the region 1101*c*.

As seen from the above examples 1100, 1110 and 1120, the greater the number of AP devices, the smaller the region for recognizing a location. Namely, the accuracy of location recognition is improved.

Figure 12:
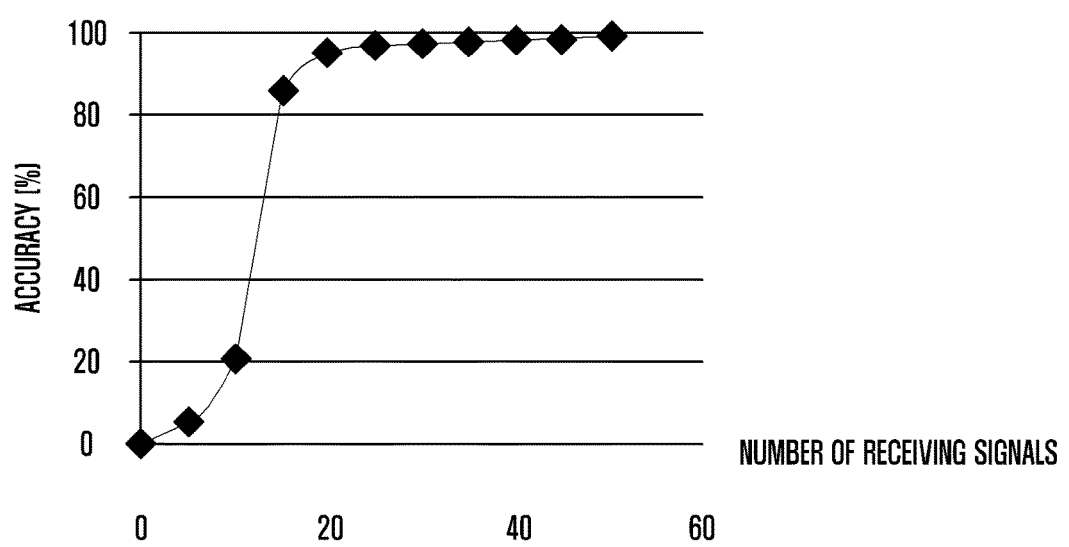
FIG. 12 is a graph illustrating example variations of the accuracy of location recognition depending on the number of access point signal scans according to various example embodiments of the present disclosure.

FIG. 12 is a graph illustrating example variations of the accuracy of location recognition depending on the number of access point signal scans according to various example embodiments of the present disclosure.

Referring to FIG. 12, the accuracy of location recognition may be improved based on the number of times of receiving a signal from the AP device. Namely, since the mean value and standard deviation value of the signal strength received from the AP device are used in recognizing the location, much more data to be calculated may enhance the accuracy. According to one embodiment, as shown in the graph of FIG. 12, the accuracy increases sharply when signals are received about 18 times.

Figure 13:
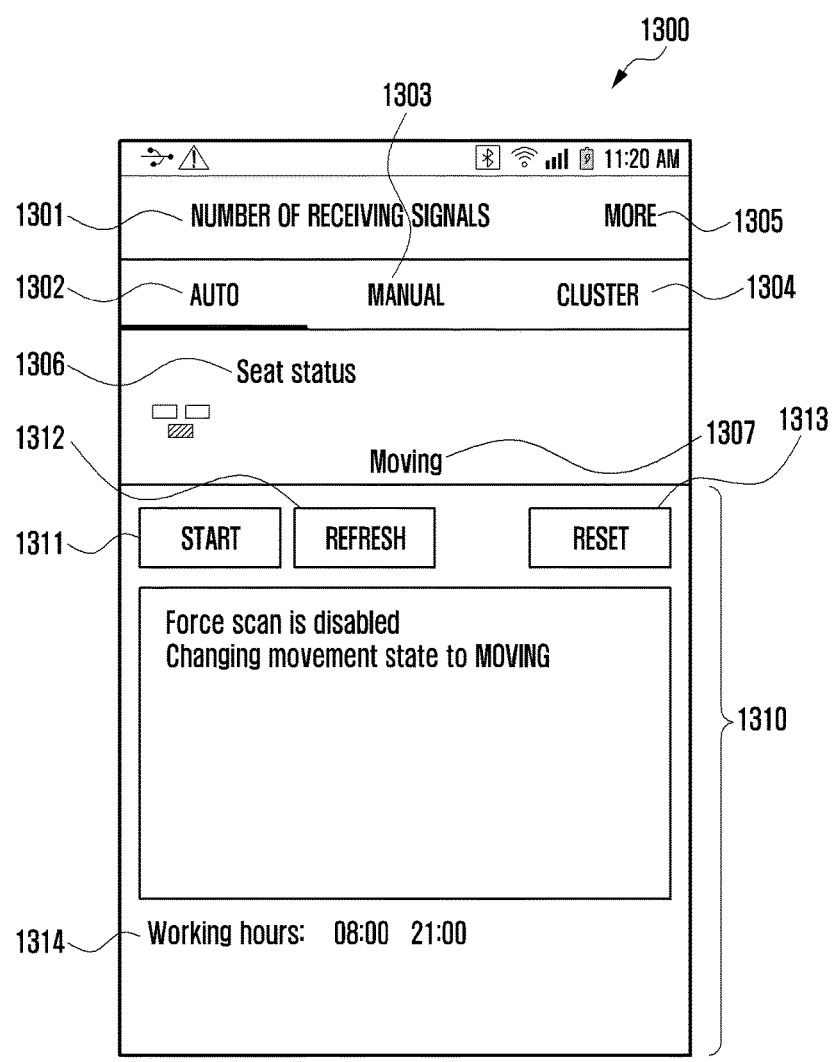
FIG. 13 is a diagram illustrating an example user interface for providing a location recognition service according to various example embodiments of the present disclosure.

FIG. 13 is a diagram illustrating an example user interface for providing a location recognition service according to various example embodiments of the present disclosure.

Referring to FIG. 13, the electronic device may offer a user interface 1300 for setting a specific location in order to provide a location recognition service. The user interface 1300 may display a name 1301 indicating the location recognition service, and may include a 'More' button 1305 to enable additional settings. Also, the user interface 1300 may include an 'Auto' button 1302, a 'Manual' button 1303, and a 'Cluster' button 1304 which are linked to an automatic mode, a manual mode, and a cluster mode, respectively. Also, the user interface 1300 may display a phrase 1306 denoting the status of the electronic device, and a phrase 1307 indicating that the electronic device is moving. If the electronic device completes location recognition, a phrase 'Personal seat is detected' may be displayed.

In an example embodiment, the automatic mode among several modes of the user interface 1300 will be described hereinafter. In the automatic mode, the user interface 1300 may include a task window 1310 used for performing the location recognition service. The task window 1310 may have a 'Start' button 1311 for receiving an instruction to start location recognition, a 'Refresh' button 1312 for newly recognizing the location, and a 'Reset' button 1313 for resetting the location recognition operation. Depending on the selected button, the phrase displayed on the task window 1310 may be different. In an example embodiment, the phrase shown in FIG. 13 may be a phrase indicating that the electronic device is being driven in the automatic mode for location recognition and that the electronic device is currently placed at a fixed location. Additionally, the user interface 1300 may receive a user input for setting working hours 1314 from a start time to an end time for recognizing the location in the automatic mode.

The electronic device that performs location recognition in the automatic mode may start and end the recognition at the start time and the end time designated respectively by the user. In one embodiment, if the user wishes to perform the location recognition in the office, the start and end times may be business hours.

According to various embodiments, cluster data may be generated, based on signals collected from AP devices for a designated time. The electronic device may recognize a specific location, based on the generated cluster data. In an example embodiment, the cluster data may be generated through agglomerative hierarchical clustering and will be described in greater detail below with reference to FIG. 14.

For example, the user who carries the electronic device may move in the office for a business hour which is set up as a designated time. As the user moves, the electronic device may receive signals from a plurality of AP devices. Then the electronic device may recognize a plurality of locations on the basis of the received signals and set up, as a specific location, a frequently recognized locations among the plurality of locations.

In an example embodiment, the electronic device may analyze business hours and a pattern of time when the electronic device does not move, and set up at least one of the recognized locations as a specific location.

In an example embodiment, the electronic device may set up a period as well as a designated time for receiving signals from AP devices. In one embodiment, the electronic device may be set up to recognize the location for three days from 8 am to 6 pm. Based on this, the electronic device may set up, as a specific location, the most frequently recognized location in a specific time zone among a plurality of recognized locations.

According to various embodiments, in the automatic mode, the electronic device may further perform an operation of determining whether the electronic device is placed at a specific location. In one embodiment, after the designated time or period for setting a specific location expires, the electronic device may determine whether the electronic device arrives at a specific location, based on signals received while the location thereof is varied. In another embodiment, when there is any additional user input, a function of determining whether a specific location is reached may be performed.

Figure 14:
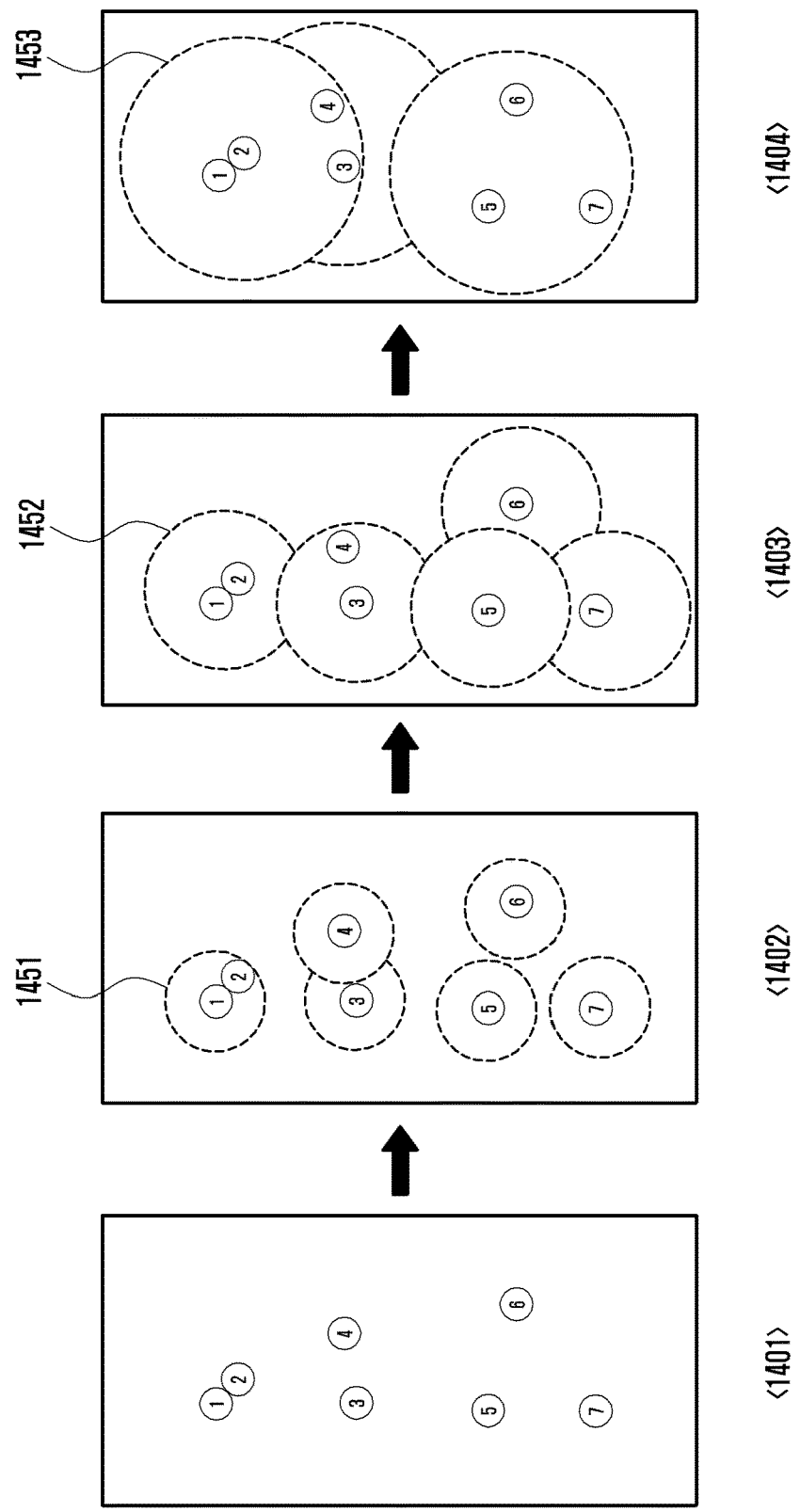
FIG. 14 is a diagram illustrating an example method for recognizing a specific location according to various example embodiments of the present disclosure.

FIG. 14 is a diagram illustrating an example method for recognizing a specific location according to various embodiments of the present disclosure.

As previously discussed in FIG. 13, the cluster data may be formed from signals received from the AP devices through agglomerative hierarchical clustering and then a specific location may be recognized based on the cluster data. The term 'agglomerative hierarchical clustering' may be also referred to as coherent hierarchical clustering or hierarchical clustering.

Referring to FIG. 14, at step 1401, the electronic device may recognize locations 1, 2, 3, 4, 5, 6 and 7. Then the electronic device may merge similar locations. Namely, at step 1402, the closest locations 1 and 2 are merged into one location. After the locations 1 and 2 are merged at step 1402, a region recognized as the location is expanded as indicated by a reference numeral 1451.

Thereafter, similar locations may be further merged into one, based on the size of the expanded region 1451. Namely, at step 1403, the locations 3 and 4 are merged into one location, based on the size of the expanded region 1451. After the locations 3 and 4 are merged at step 1403, a region recognized as the location is further expanded as indicated by a reference numeral 1452.

Thereafter, similar locations may be further merged into one, based on the size of the further expanded region 1452.

Namely, at step 1404, the locations 1, 2, 3 and 4 are merged into one location, and also the locations 5, 6 and 7 are merged into one location. Therefore, a region recognized as the location is further expanded as indicated by a reference numeral 1453.

By performing the above-discussed clustering operation, the recognized location can be simplified even if there are a plurality of recognized locations due to a frequent movement of the electronic device during the designated time. This allows the electronic device to increase the accuracy of recognizing a specific location.

Figure 15:
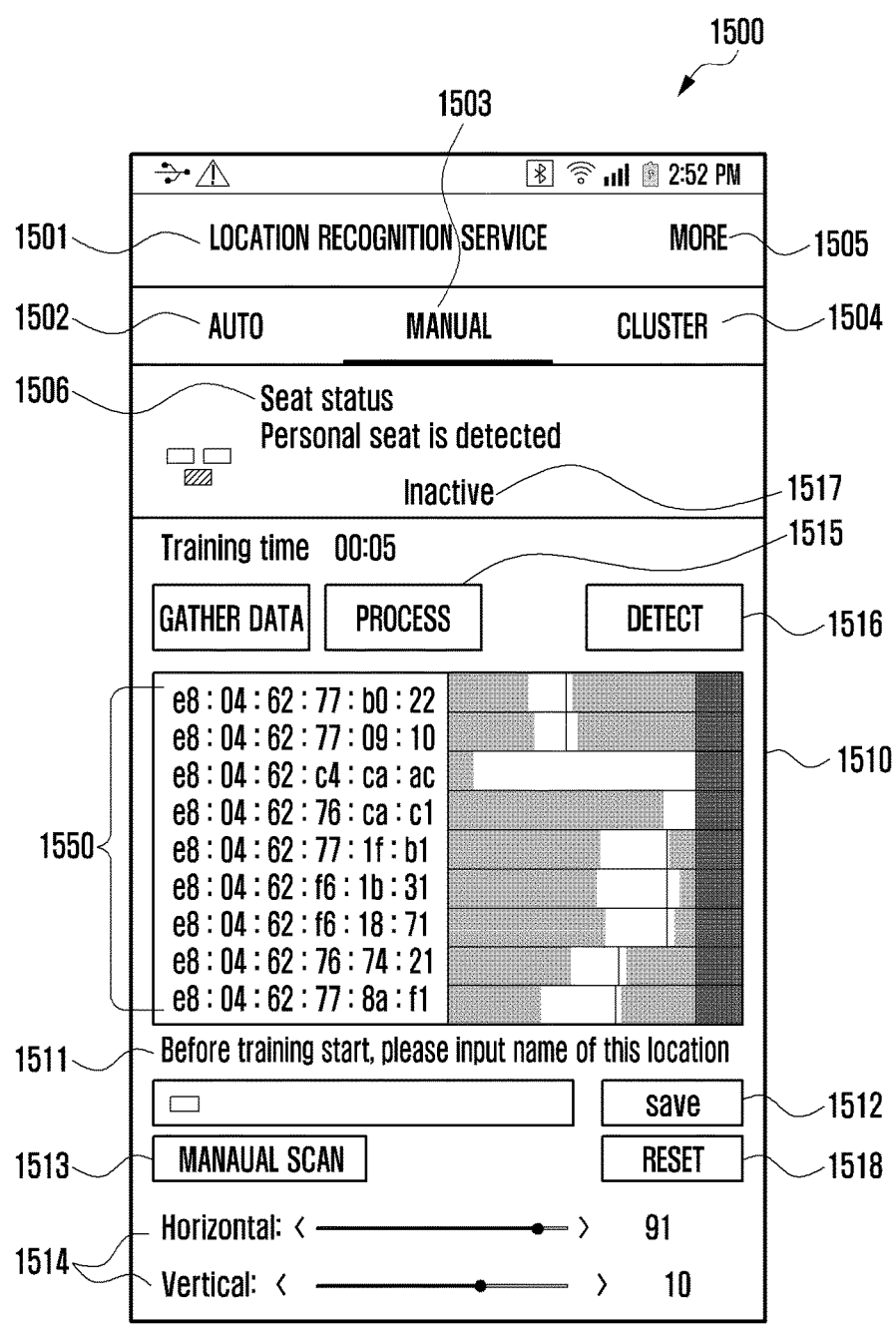
FIG. 15 is a diagram illustrating an example user interface for providing a location recognition service according to various example embodiments of the present disclosure.

FIG. 15 is a diagram illustrating an example user interface for providing a location recognition service according to various example embodiments of the present disclosure.

Referring to FIG. 15, the electronic device may offer a user interface 1500 for setting a specific location in order to provide a location recognition service. The user interface 1500 may display a name 1501 indicating the location recognition service, and may include a 'More' button 1505 to enable additional settings. Also, the user interface 1500 may include an 'Auto' button 1502, a 'Manual' button 1503, and a 'Cluster' button 1504 which are linked to an automatic mode, a manual mode, and a cluster mode, respectively. Also, the user interface 1500 may display a phrase 1506 denoting the status of the electronic device, and also display a phrase 1517 'inactive' if the electronic device does not recognize the location. If the electronic device completes location recognition, a phrase 'Personal seat is detected' may be displayed.

In an example embodiment, the user interface 1500 in the manual mode may include a task window 1510 used for performing the location recognition service. The task window 1510 may display an input window 1511 for entering a name of a location to be designated as a specific location before performing the location recognition, and a 'Save' button 1512 for storing the entered name of the specific location. The user interface 1500 may include a 'Manual Scan' button 1513 for receiving signals from AP devices and a 'Reset' button 1518 for resetting the signal receiving operation.

When detecting a user input of selecting the 'Manual Scan' button 1513, the electronic device that performs the location recognition in the manual mode may receive signals from the AP devices a predetermined number of times. When detecting a user input of selecting a 'Process' button 1515, the electronic device may process the signals received in response to the selection of the 'Manual Scan' button 1513 to generate a recognition model as a specific location. In one embodiment, the recognition model may refer to the AP list described above with reference to FIG. 4. The electronic device may store the generated recognition model.

According to various embodiments, in the manual mode, the electronic device may determine whether the electronic device arrives at a specific location. In the manual mode, the user interface 1500 may include a 'Detect' button 1516 to determine whether the electronic device arrives at a specific location. When the user selects the 'Detect' button 1516, the electronic device may determine whether the electronic device arrives at a specific location. In another embodiment, if the user does not move the electronic device, the electronic device may determine whether the electronic device arrives at a specific location. In determining whether the electronic device arrives at a specific location, the electronic device may compare the previously stored recognition model with information generated based on the received signal at the above location. This may correspond to the above-discussed operation 604 in FIG. 6.

In the manual mode, if the selection of the 'Detect' button is detected or if the electronic device does not move, the user interface 1500 may display the AP information received from the AP devices so as to determine whether the electronic apparatus arrives at a specific location. The AP information may include an SSID 1550 corresponding to the AP device, and the strength of the signal.

In the manual mode, the user interface 1500 may set up the size of a region when setting a specific location. The set-up of the region size may be performed by detecting a user input as indicated by a reference numeral 1514.

Figure 16:
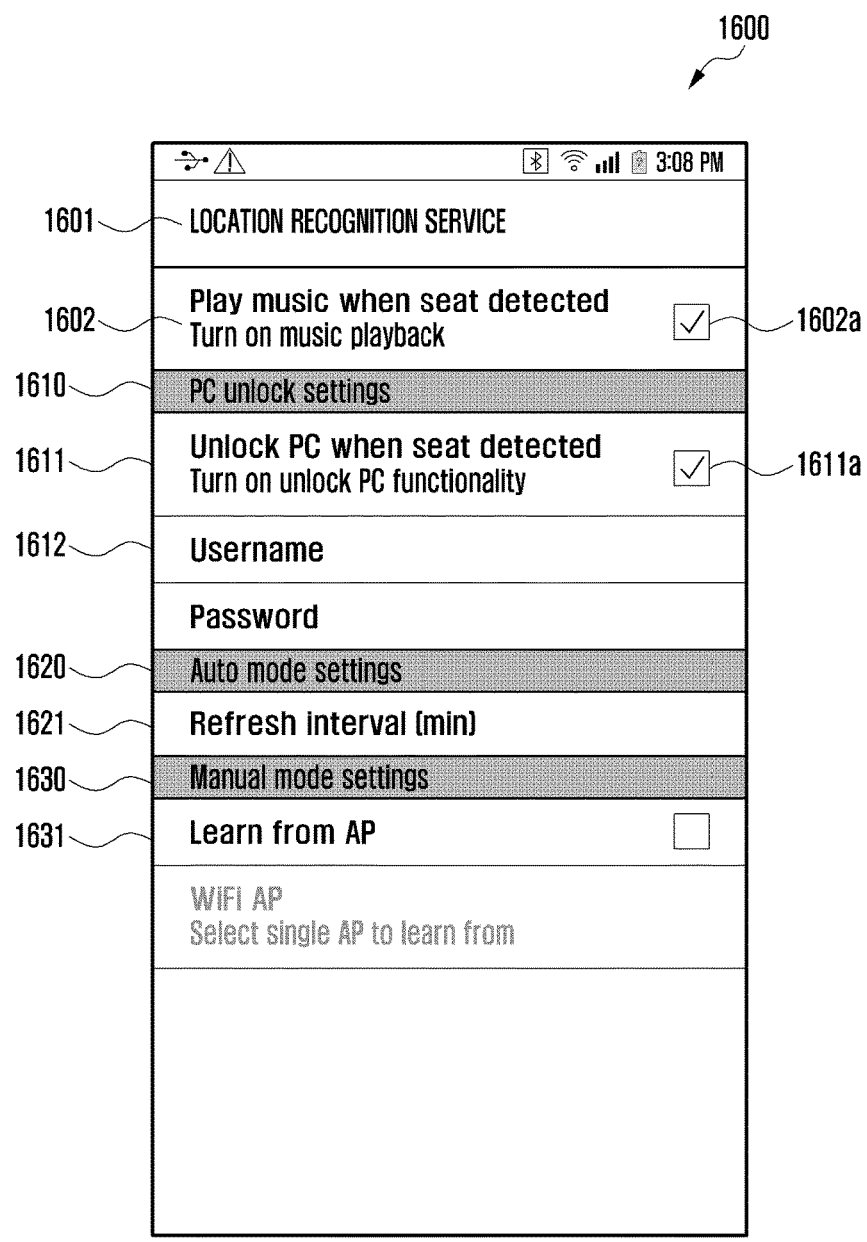
FIG. 16 is a diagram illustrating an example user interface for providing a location recognition service according to various example embodiments of the present disclosure.

FIG. 16 is a diagram illustrating an example user interface for providing a location recognition service according to various example embodiments of the present disclosure.

Referring to FIG. 16, a user interface 1600 may be displayed when the 'More' button 1405 or 1505 is selected in FIG. 13 or 15. The user interface 1600 may display a name 1601 indicating the location recognition service. The user interface 1600 may be provided to further set up a function to be performed when the electronic device arrives at a specific location.

In an example embodiment, the user interface 1600 may include a setting 1602 for playing music when the electronic device arrives at a specific location, and a mark 1602a indicating that this function is activated.

In another embodiment, the user interface 1600 may include settings 1610 and 1611 for unlocking the PC when the electronic device arrives at a specific location, and a mark 1611a indicating that this function is activated. In addition, the user interface 1600 may further include an input window 1612 for entering a user name, e.g., an ID and a password, necessary for unlocking the PC.

According to various embodiments, the user interface 1600 may set up the operation in the automatic mode (see a reference numeral 1620). In one embodiment, the user interface 1600 may provide a function 1621 to set up a time interval of performing location recognition in the automatic mode. Also, the user interface may set up the operation in the manual mode (see a reference numeral 1630). In one embodiment, the user interface may provide a function 1631 of verifying AP information from the AP device (e.g., a WiFi AP), and include a mark indicating that this function is activated.

While the present disclosure has been illustrated and described with reference to various example embodiments thereof, it will be understood by those skilled in the art that various changes in form and details may be made therein without departing from the scope of the disclosure as defined by the appended claims and their equivalents.

What is claimed is:
1. An electronic device comprising:
  a communication module comprising communication circuitry configured to receive access point (AP) information from each of a plurality of AP devices;
  a memory; and
  a processor,
  wherein the processor is configured to:
  obtain, from the AP information, a strength value of a signal and a unique value of the AP device that transmits the signal,
  process the AP information based on the strength value of the signal and the unique value of the AP device,
  determine whether the received AP information satisfies a condition for performing a predefined function for controlling an external electronic device with regard to a previously stored AP list stored in the memory, and perform the predefined function if the condition is satisfied.

2. The electronic device of claim 1, wherein the processor is further configured to determine a mean value and a standard deviation value of strength values of the signal corresponding to the unique value, based on the unique value.

3. The electronic device of claim 2, wherein the processor is further configured to convert the strength values corresponding to a given unique value that are within a predetermined value or less, to a single strength value corresponding to the given unique value.

4. The electronic device of claim 1, wherein the processor is further configured to match a mean value and a standard deviation value of the strength values of the signal, with the unique value, and to store the unique value, the mean value and the standard deviation value in the memory.

5. The electronic device of claim 1, wherein the processor is further configured to identify the unique value received more than a predetermined number of times in the AP information received by the communication module, and to process the AP information including the identified unique value.

6. The electronic device of claim 1, wherein the processor is further configured to control the communication module to receive the AP information at predetermined times, to process the received AP information, to create another AP list based on a processing result, to compare the created AP list with the stored AP list, and to store the created AP list as information indicating the location of the electronic device in the memory if the created AP list is not identical with the stored AP list based on the comparison.

7. The electronic device of claim 1, wherein the processor is further configured to determine that the AP information satisfies a condition for performing the function if a predetermined number of the unique values contained in the AP information are identical with the unique values recorded in the AP list or if the signal strength corresponding to the unique value contained in the AP information is within a range of the signal strength corresponding to the unique value recorded in the AP list.

8. The electronic device of claim 7, wherein the range of the signal strength is created based on each unique value recorded in the AP list and based on a mean value and a standard deviation value of the signal strength matched with the unique value.

9. The electronic device of claim 7, wherein the processor is further configured to perform the function if the condition and a predefined time to perform the function are satisfied.

10. The electronic device of claim 7, wherein the function includes a function of unlocking the external electronic device.

11. The electronic device of claim 7, further comprising:
a display,
wherein the processor is further configured to control the display to display a determining result.

12. The electronic device of claim 11, wherein the processor is further configured to control the display to display a user interface.

13. A method for recognizing a location of an electronic device and controlling an external electronic device, the method comprising:
receiving, from each of a plurality of access point (AP) devices, AP information including a strength value of a signal received for a predetermined time and a unique value of the AP device that transmits the signal;
processing the received AP information;
creating an AP list comprising information for indicating the location of the electronic device based on a result of the processing;
storing the created AP list;
determining whether the AP information satisfies a condition for performing a predefined function for controlling an external electronic device with regard to a previously stored AP list, and
performing the predefined function if the condition is satisfied.

14. The method of claim 13, wherein the processing includes determining a mean value and a standard deviation value of strength values of the signal corresponding to the unique value, based on the unique value.

15. The method of claim 14, wherein the determining is performed after converting the strength values corresponding to a given unique value that are within a predetermined value or less from among the strength values of the received signal corresponding to the given unique value, to a single strength value corresponding to the unique value.

16. The method of claim 13, wherein the creating includes matching a mean value and a standard deviation value of the strength values of the signal, determined based on the unique value, with the unique value, and storing the unique value, the mean value and the standard deviation value.

17. The method of claim 13, wherein the processing includes identifying the unique value received more than a predetermined number of times in the AP information, and processing the AP information including the identified unique value.

18. The method of claim 13, further comprising:
receiving the AP information at predetermined times;
processing the received AP information;
creating the AP list based on a processing result;
comparing the created AP list with the previously stored AP list; and
storing the created AP list as information indicating the location of the electronic device in the memory if the created AP list is not identical with the previously stored AP list based on the comparing.

19. A method for performing a predefined function based on recognition of a location of an electronic device, the method comprising:
receiving, from each of a plurality of access point (AP) devices, AP information including a strength value of a signal received for a predetermined time and a unique value of the AP device that transmits the signal;
determining whether the received AP information satisfies a condition for performing a particular function for controlling an external electronic device with regard to an AP list previously stored as information for indicating the location of the electronic device; and
performing the particular function if the condition is satisfied.

20. The method of claim 19, wherein the determining includes determining that the AP information satisfies the condition for performing the function if a predetermined number of the unique values contained in the AP information are identical with the unique values recorded in the previously stored AP list and/or if the signal strength corresponding to the unique value contained in the AP information is within a range of the signal strength corresponding to the unique value recorded in the previously stored AP list, and wherein the range of the signal strength is created based on each unique value recorded in the previously stored AP list and based on a mean value and a standard deviation value of the signal strength matched with the unique value.

* * * * *